(12) United States Patent
Takahashi et al.

(10) Patent No.: US 8,837,770 B2
(45) Date of Patent: Sep. 16, 2014

(54) NON-TRANSITORY COMPUTER READABLE STORAGE MEDIUM, MARKER CREATING APPARATUS, AND MARKER CREATING METHOD

(75) Inventors: Jun Takahashi, Kawasaki (JP); Shohei Nakagata, Kawasaki (JP); Kensuke Kuraki, Kawasaki (JP); Taizo Anan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 13/137,793

(22) Filed: Sep. 13, 2011

(65) Prior Publication Data

US 2012/0002877 A1 Jan. 5, 2012

Related U.S. Application Data

(63) Continuation of application No. PCT/JP2009/055519, filed on Mar. 19, 2009.

(51) Int. Cl.
*G06K 9/00* (2006.01)
*H04N 1/44* (2006.01)
*G06T 1/00* (2006.01)

(52) U.S. Cl.
CPC ...... *H04N 1/4486* (2013.01); *G06T 2201/0051* (2013.01); *G06T 1/0028* (2013.01); *G06T 2201/0203* (2013.01)
USPC .......................................... 382/100; 382/232

(58) Field of Classification Search
CPC .................. H04N 21/8358; H04N 2201/3236; H04N 19/0009; H04N 1/32149; H04N 19/00072; H04N 19/00109; H04N 19/0026; H04N 19/00303; H04N 19/00387; H04N 19/00472; H04N 19/00951; H04N 21/84; H04N 2201/3205; H04N 2201/3233; H04N 2201/327; H04N 19/00557; H04N 2005/91335; H04N 19/00872; G06T 2201/0052; G06T 1/005; G06T 9/004; G06T 1/0071; G06T 2201/0051; G06T 2201/0061; G06T 9/00; G06T 2201/0203; G09G 5/393; G06F 9/3855
See application file for complete search history.

(56) References Cited

U.S. PATENT DOCUMENTS 5,726,435 A 3/1998 Hara et al.
5,889,893 A * 3/1999 Robson .......................... 382/296

(Continued)

FOREIGN PATENT DOCUMENTS

EP 2104331 9/2009
JP 7-254037 10/1995

(Continued)

OTHER PUBLICATIONS

Korean Office Action issued Oct. 8, 2012 in corresponding Korean Patent Application No. 10-2011-7021521.

(Continued)

*Primary Examiner* — Manav Seth
(74) *Attorney, Agent, or Firm* — Staas & Halsey LLP

(57) ABSTRACT

When creating a marker, an encryption apparatus extracts each pixel value in a region and allows a storing unit to save, as restoration information, the high-order bits of each extracted pixel value. Then, the encryption apparatus creates a marker by changing the high-order bits of the pixel value in a region in which the marker is created and embeds encrypted information in an encrypted region specified by the marker. When decoding the encrypted information, a decoding apparatus detects the marker from a digital image, decodes the encrypted information in the encrypted region specified by the marker, and overwrites bits contained in the restoration information with the high-order bits of the pixel value of the marker.

10 Claims, 23 Drawing Sheets

(56) References Cited

U.S. PATENT DOCUMENTS

| | | | |
|---|---|---|---|
| 6,343,138 B1* | 1/2002 | Rhoads | 382/100 |
| 7,281,272 B1 | 10/2007 | Rubin et al. | |
| 7,443,999 B2* | 10/2008 | Muratani | 382/100 |
| 7,643,689 B2* | 1/2010 | Yoshigahara et al. | 382/232 |
| 2004/0135906 A1 | 7/2004 | Okada | |
| 2009/0262931 A1 | 10/2009 | Nakagata et al. | |
| 2009/0323950 A1* | 12/2009 | Nakagata et al. | 380/243 |

FOREIGN PATENT DOCUMENTS

| | | |
|---|---|---|
| JP | 2001-320578 | 11/2001 |
| JP | 2002-300374 | 10/2002 |
| JP | 2008-301044 | 12/2008 |
| WO | 2008/053545 A1 | 5/2008 |

OTHER PUBLICATIONS

Japanese Office Action for corresponding Japanese Patent Application No. 2011-504692, mailed Apr. 24, 2012.
Extended European Search Report dated Jul. 13, 2012 issued in corresponding European Patent Application No. 09841883.3.
International Search Report for PCT/JP2009/055519, mailed Apr. 21, 2009.

* cited by examiner

RESTORATION INFORMATION
MANAGEMENT TABLE

| COORDINATES | RESTORATION INFORMATION |
|---|---|
| x1, y1 | 11 |
| x2, y2 | 10 |
| ... | ... |

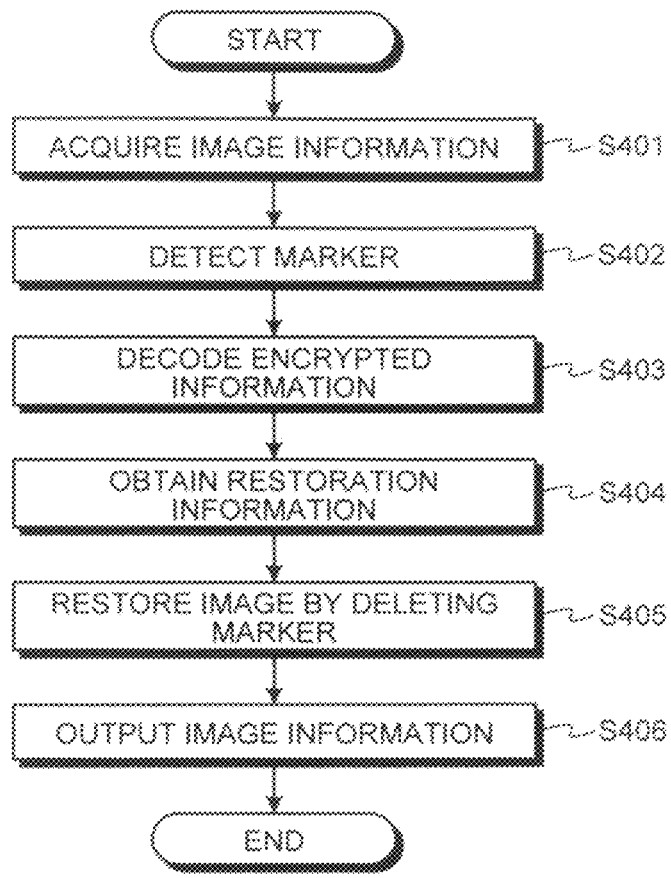
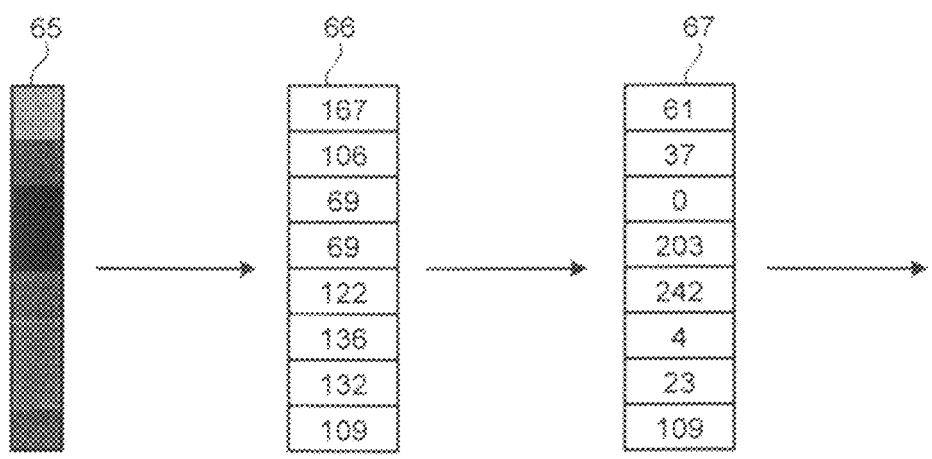

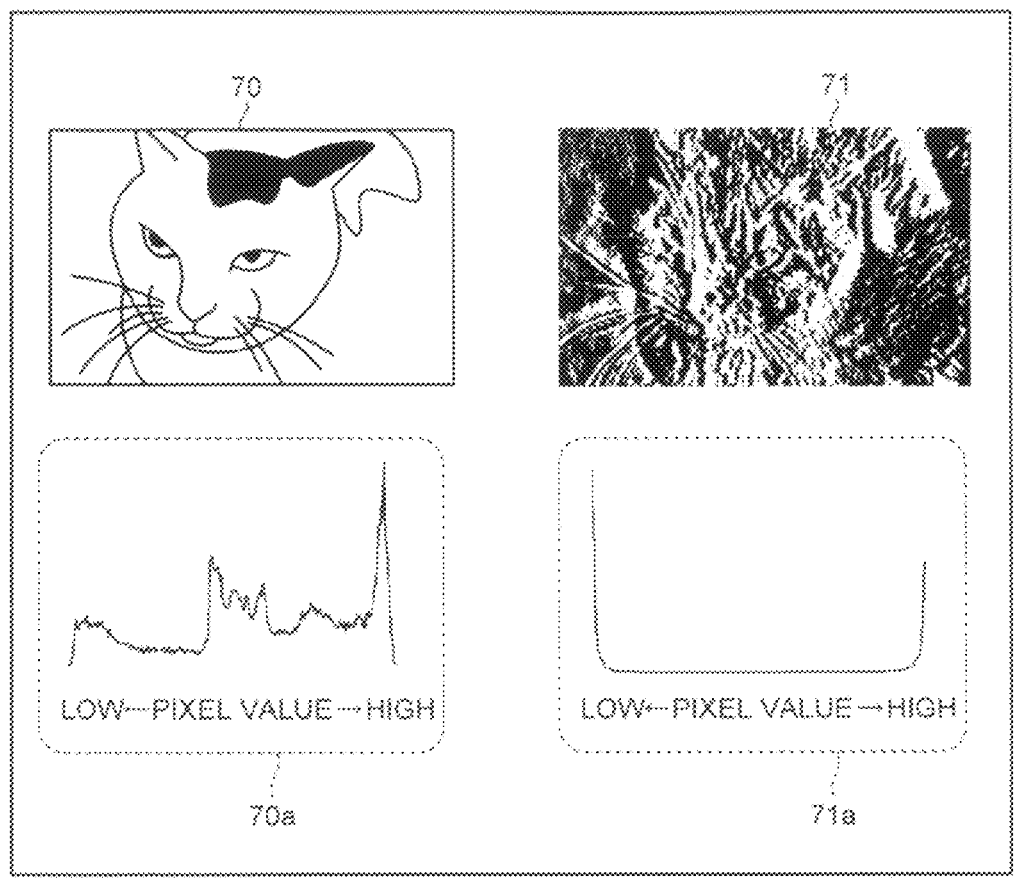

NON-TRANSITORY COMPUTER READABLE STORAGE MEDIUM, MARKER CREATING APPARATUS, AND MARKER CREATING METHOD

CROSS-REFERENCE TO RELATED APPLICATION

This application is a continuation of International Application No. PCT/JP2009/055519, filed on Mar. 19, 2009, the entire contents of which are incorporated herein by reference.

FIELD

The embodiments discussed herein are directed to a marker creating program for creating a marker on an image, to a marker creating apparatus and, to a marker creating method of the same and also directed to a restoration program for restoring an original image by removing the marker that is on the image and a restoration apparatus of the same.

BACKGROUND

In recent years, various technologies for creating encrypted information in which information on an URL or the like is coded or encrypted and for embedding the created encrypted information in a digital image or adding it to printed material have been developed (for example, see Patent Document 1). Furthermore, if encrypted information is embedded in a digital image (or added to printed material) without processing, it is impossible to determine the coordinates in an encrypted region on a digital image when the encrypted information is decoded. Accordingly, a technology for arranging markers at the four corners of the encrypted region at the time of the encryption has also been designed (see Patent Document 2).

Here, the conventional technology for arranging markers at the four corners of the encrypted region will be described. FIG. 29 is a schematic diagram illustrating a conventional technology. As illustrated in FIG. 29, with the conventional technology, when encrypted information is embedded in a digital image 10 to be encrypted, first, an encrypted region 11 is set (Step S10).

Subsequently, with the conventional technology, the encrypted information is embedded in the encrypted region 11 and markers 12 are arranged at the four corners of the encrypted region 11 (Step S11). Then, at the time of the decoding, the markers 12 arranged at the four corners of the encrypted region 11 are detected, the location of the encrypted region 11 is specified, and the encrypted information in the encrypted region 11 is decoded (Step S12).

Patent Document 1: Japanese Laid-open Patent Publication No. 07-254037
Patent Document 2: Japanese Laid-open Patent Publication No. 2008-301044

Because the markers 12 on a digital image 20 illustrated in FIG. 29 can be detected after printing, it is possible to decode an encrypted image regardless of whether it is printed material or a digital image. However, when an encryption process is performed, the markers 12 are overwritten on the digital image; therefore, there is a problem in that the markers 12 remain on a decoded digital image 30.

Furthermore, it is possible to perform two-dimensional coding on an encrypted region by using the technology disclosed in, for example, Japanese Laid-open Patent Publication No. 07-254037. However, at the time of the decoding, it is preferable to arrange markers that are used to specify the coordinates in an encrypted region. Accordingly, it is not possible to solve the problem of a marker remaining on the digital image.

The present invention has been conceived to solve the problems of the conventional technology described above, and an object thereof is to provide a marker creating program, a restoration program, a marker creating apparatus, a restoration apparatus, and a marker creating method that can completely restore an encrypted image without leaving a marker on the image.

SUMMARY

According to an aspect of an embodiment of the invention, a non-transitory computer readable storage medium stores therein a marker creating program, the marker creating program causing a computer to execute a process includes extracting, when a region in which a marker is created is set on an image, restoration information for restoring a pixel in the region; and creating the marker by changing the pixel in the region.

The object and advantages of the embodiments will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 17 is a flowchart illustrating a process performed by the decoding apparatus according to the second embodiment.

FIG. 18 is a schematic diagram illustrating the outline of an encryption apparatus according to a third embodiment.

FIG. 19 is a schematic diagram illustrating an example of an image created by calculating difference values.

DESCRIPTION OF EMBODIMENTS

Preferred embodiments of a marker creating program, a restoration program, a marker creating apparatus, a restoration apparatus, and a marker creating method according to the present invention will be described in detail with reference to the accompanying drawings. In the following embodiments, an embodiment of the marker creating program will be described using an encryption apparatus as an example, and an embodiment of the restoration program will be described using a decoding apparatus as an example.

[a] First Embodiment

Figure 1:
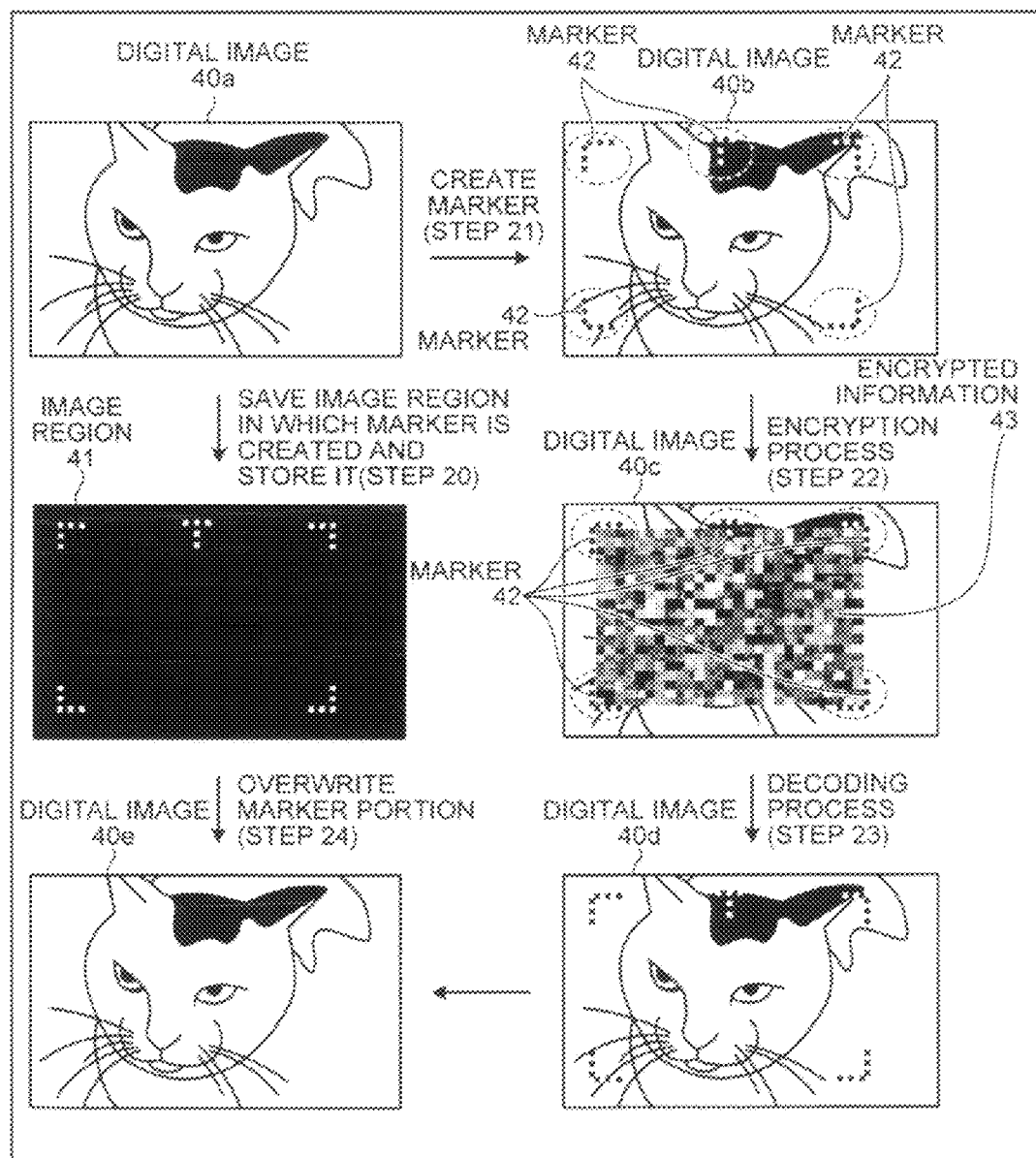
FIG. 1 is a schematic diagram illustrating the underlying technology.

Before the encryption apparatus and the decoding apparatus according to the present invention are described, an encryption apparatus and a decoding apparatus that use the underlying technology of the present invention will be described. However, the underlying technology described below does not correspond to a conventional technology. FIG. 1 is a schematic diagram illustrating the underlying technology.

As illustrated in FIG. 1, when embedding encrypted information by arranging markers on a digital image 40a, the encryption apparatus (not illustrated) saves information contained in an image region 41 in which the markers are overwritten when they are created and stores the information in a storing unit (Step S20). After saving the information in the image region 41, the encryption apparatus creates markers 42 and arranges them on the digital image 40a, thus creating a digital image 40b (Step S21). Then, by creating encrypted information 43 and embedding it in the digital image 40b, the encryption apparatus creates an encrypted digital image 40c (Step S22).

In contrast, when the decoding apparatus (not illustrated) restores the digital image 40c, the decoding apparatus detects the markers 42 on the digital image 40c, specifies an encrypted region, and then decodes encrypted information contained in the encrypted region, thus creating a digital image 40d (Step S23). Then, by using the information in the image region 41 saved by the encryption apparatus, the decoding apparatus creates a digital image 40e in which the markers are deleted (Step S24).

In this way, with the underlying technology, after saving all of the image information in a region that is used to create markers, the markers are arranged on a digital image and then encrypted information is embedded. To solve the problem of markers remaining on the digital image, when the digital image is decoded, the encrypted information is decoded and the marker is removed from the image by using the saved image information.

However, with the underlying technology described above, because all of the information in the image region 41 in which the markers are overwritten when they are created is saved, when performing the encryption process or the decoding process on a multi level image, such as a color image, by using the underlying technology described above, the amount of information to be saved becomes large; therefore, a new problem of suppressing the amount of available memory resources occurs.

Figure 2:
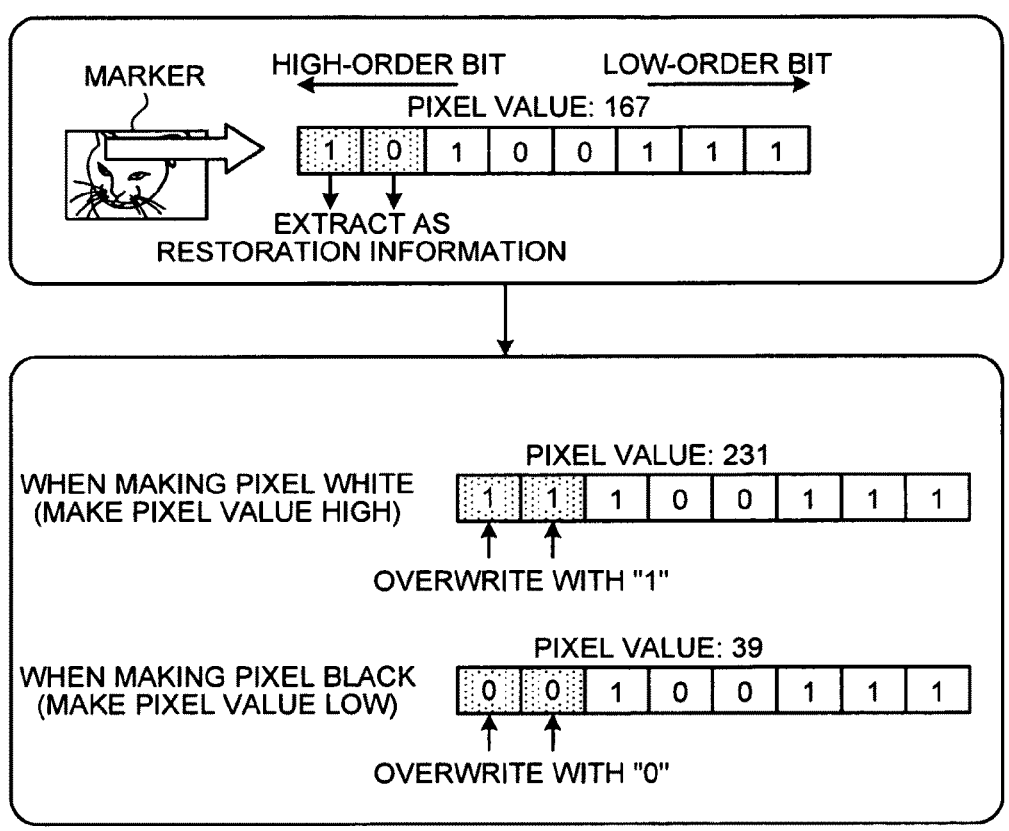
FIG. 2 is a schematic diagram illustrating the outline of an encryption apparatus and a decoding apparatus according to a first embodiment.

In the following, an encryption apparatus and a decoding apparatus according to a first embodiment will be described. FIG. 2 is a schematic diagram illustrating the outline of an encryption apparatus and a decoding apparatus according to the first embodiment. As illustrated in the upper portion of FIG. 2, when creating a marker, instead of saving all of the pieces of image information in a region in which the marker is created, the encryption apparatus extracts each pixel value in the region and allows a storing unit to save high-order n bits (n is a natural number) of the extracted pixel values as restoration information. In the following embodiments, a description is given in which the high-order n bits are represented as high-order 2 bits; however, the embodiments are not limited thereto.

The encryption apparatus creates a marker by changing an image in a region in which the marker is created to white or black. Specifically, as illustrated in the lower portion of FIG. 2, if a pixel value is 8-bit information and also if a pixel is made black for lower pixel values and white for higher pixel values, the encryption apparatus creates a marker by overwriting each of the high-order 2 bits of the pixel value with "1" when a pixel of the marker is made white and by overwriting each of the high-order 2 bits of the pixel with "0" when the pixel of the marker is made black. After creating the marker, the encryption apparatus creates encrypted information in a similar manner as in the conventional technology and embeds the created encrypted information in accordance with the marker.

In contrast, when the decoding apparatus decodes the encrypted information, the decoding apparatus detects the marker from a digital image and decodes the encrypted information in the encrypted region specified by the marker. Then, the decoding apparatus restores the image in the region in which the marker is created by overwriting 2 bits contained in the restoration information (the restoration information saved by the encryption apparatus) on each of the high-order 2 bits of the pixel value of the marker. In this way, an encryption apparatus 100 and a decoding apparatus 200 according to the first embodiment extract, as the restoration information, a part of the pixel value of the region in which the marker is created and restore the marker to the original image in accordance with the extracted restoration information. Accordingly, it is possible to completely restore the encrypted image without suppressing the amount of available memory resources or the like.

Figures 3, 4:
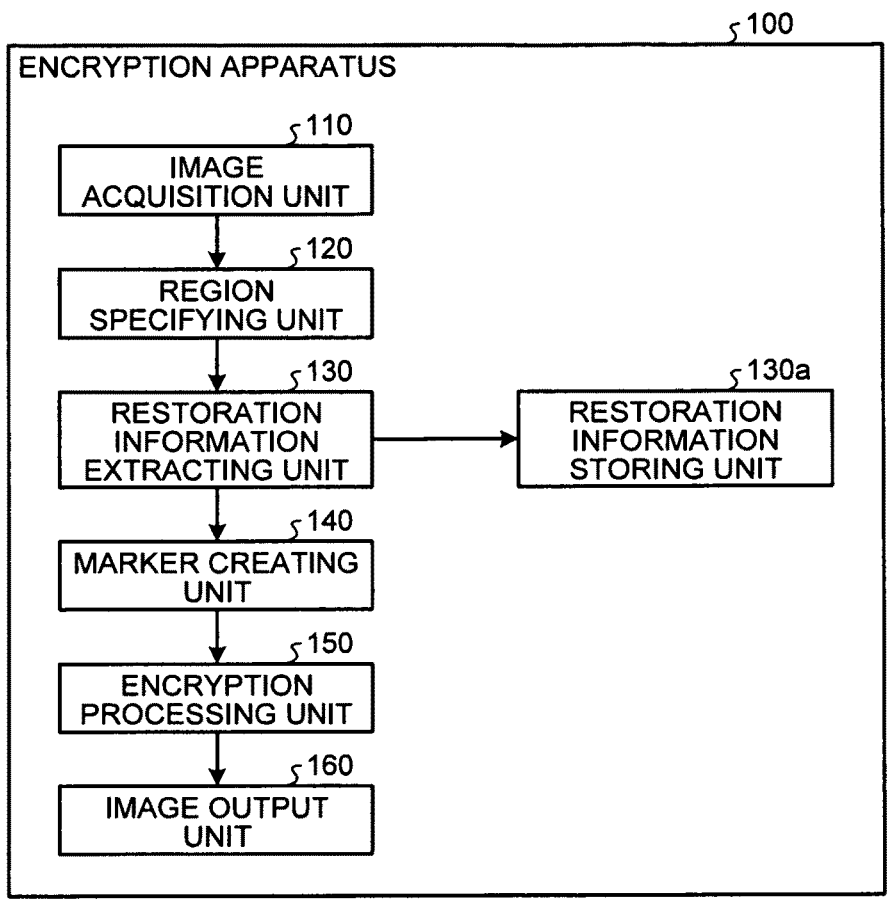
FIG. 3 is a functional block diagram illustrating the configuration of the encryption apparatus according to the first embodiment.
FIG. 4 is a schematic diagram illustrating an example of the data structure of a restoration information management table according to the first embodiment.

In the following, the configuration of the encryption apparatus according to the first embodiment will be described. FIG. 3 is a functional block diagram illustrating the configuration of the encryption apparatus according to the first embodiment. As illustrated in FIG. 3, the encryption apparatus 100 includes an image acquisition unit 110, a region specifying unit 120, a restoration information extracting unit 130, a restoration information storing unit 130*a*, a marker creating unit 140, an encryption processing unit 150, and an image output unit 160.

The image acquisition unit 110 includes a scanning apparatus, such as a scanner, that scans information from a storage medium. The image acquisition unit 110 acquires image information, for example, stored in the storage medium or scanned by the scanner and outputs the acquired image information to the region specifying unit 120.

When obtaining the image information from the image acquisition unit 110, the region specifying unit 120 specifies a region (hereinafter, referred to as a "marker arrangement region") on an image in which a marker is arranged. The region specifying unit 120 outputs both the image information and information on the marker arrangement region to the restoration information extracting unit 130.

The region specifying unit 120 can use any method for specifying a marker arrangement region. For example, a user can specify the coordinates in an encrypted region in advance and then the region specifying unit 120 can specify a marker arrangement region on the image in accordance with the specified coordinates. Alternatively, the region specifying unit 120 can also display the image information on a display and then a user can specify a marker arrangement region using a mouse.

When obtaining the image information and the information on the marker arrangement region from the region specifying unit 120, the restoration information extracting unit 130 extracts, in accordance with the obtained information, restoration information used for restoring pixels in a region in which a marker is arranged.

Specifically, in accordance with the image information and the information on the marker arrangement region, the restoration information extracting unit 130 obtains, from the image information, a pixel value of a region in which a marker is arranged. Then, the restoration information extracting unit 130 extracts the high-order 2 bits of the acquired pixel value as restoration information. For example, as illustrated in the upper portion of FIG. 2, if a pixel value of the coordinates is 167 ("10100111" represented in binary), the restoration information extracting unit 130 extracts the high-order 2 bits, i.e., "10", as restoration information.

The restoration information extracting unit 130 associates the restoration information with the coordinates of the image in which the restoration information is extracted and stores them in the restoration information storing unit 130*a*. Furthermore, the restoration information extracting unit 130 outputs the image information and the information on the marker arrangement region to the marker creating unit 140.

The restoration information storing unit 130*a* is a storing unit that stores therein a restoration information management table. FIG. 4 is a schematic diagram illustrating an example of the data structure of the restoration information management table according to the first embodiment. As illustrated in FIG. 4, by using the restoration information management table, the restoration information storing unit 130*a* stores therein the coordinates of an image (the coordinates in a marker arrangement region) and the restoration information in an associated manner.

When obtaining the image information and the information on the marker arrangement region from the restoration information extracting unit 130, the marker creating unit 140 creates a marker, on an image, in a region corresponding to the marker arrangement region. By changing the image in the region in which a marker is arranged to white or black, the marker creating unit 140 creates a marker. The marker creating unit 140 outputs image information on the created marker to the encryption processing unit 150.

Specifically, when the marker creating unit 140 makes an image in a region in which a marker is created white (i.e., make a pixel value equal to or higher than a predetermined value), as illustrated in the lower portion of FIG. 2, the marker creating unit 140 overwrites the high-order 2 bits with "1". In contrast, when the marker creating unit 140 makes an image in a region in which a marker is created black (i.e., make a pixel value equal to or lower than a predetermined value), as illustrated in the lower portion of FIG. 2, the marker creating unit 140 overwrites the high-order 2 bits with "0".

Figure 5:
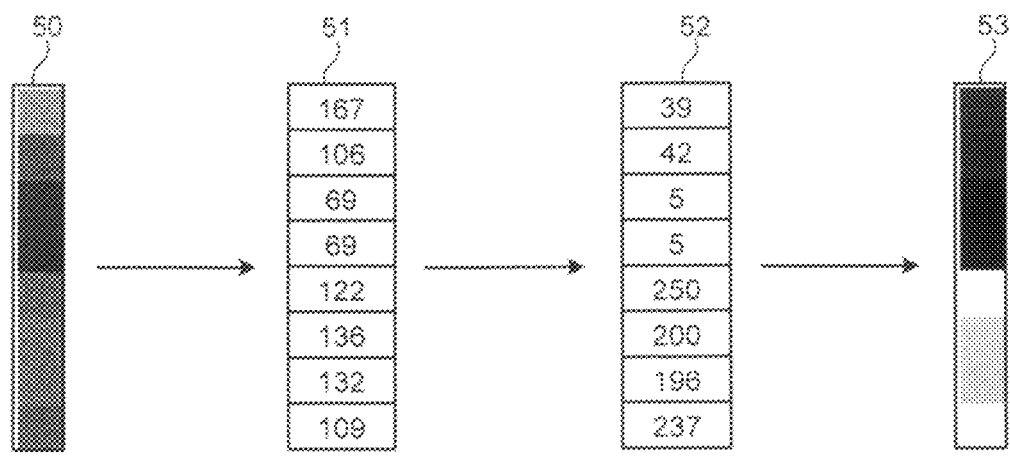
FIG. 5 is a schematic diagram illustrating an example of a process performed by a marker creating unit.

FIG. 5 is a schematic diagram illustrating an example of a process performed by the marker creating unit 140. As illustrated in FIG. 5, a digital image 50 in a region in which a marker is arranged includes 8 pixels that can represent a pixel value by 8 bits (0 to 255). If the pixels in the digital image 50 are represented by pixel values, they can be represented by pixel values 51.

From among the pixel values 51, if the marker creating unit 140 makes the 4 pixel values (167, 106, 69, and 69) from the top equal to or lower than a predetermined value (makes an image black) and makes the 5 pixel values (122, 136, 132, and 109) from the bottom equal to or higher than a predetermined value (makes an image white), the marker creating unit 140 overwrites the high-order 2 bits of each of the 4 pixel values (167, 106, 69, and 69) with "0" and overwrites the high-order 2 bits of each of the 5 pixel values (122, 136, 132, and 109) with "1".

If the marker creating unit 140 overwrites the high-order 2 bits of each of the 4 pixel values (167, 106, 69, and 69) with "0" and overwrites the high-order 2 bits of each of the 5 pixel values (122, 136, 132, and 109) with "1", the pixel values 51 are changed to pixel values 52. For example pixel value 167 ("10100111" represented in binary) is changed to pixel value 39 ("00100111" represented in binary) and pixel value 122 ("01111010" represented in binary) is changed to pixel value 250 ("11111010" represented in binary). As a result, the digital image 50 becomes a marker 53. The marker creating unit 140 performs the process illustrated in FIG. 5 on all of the pixels in a region in which markers are created.

Figure 6:
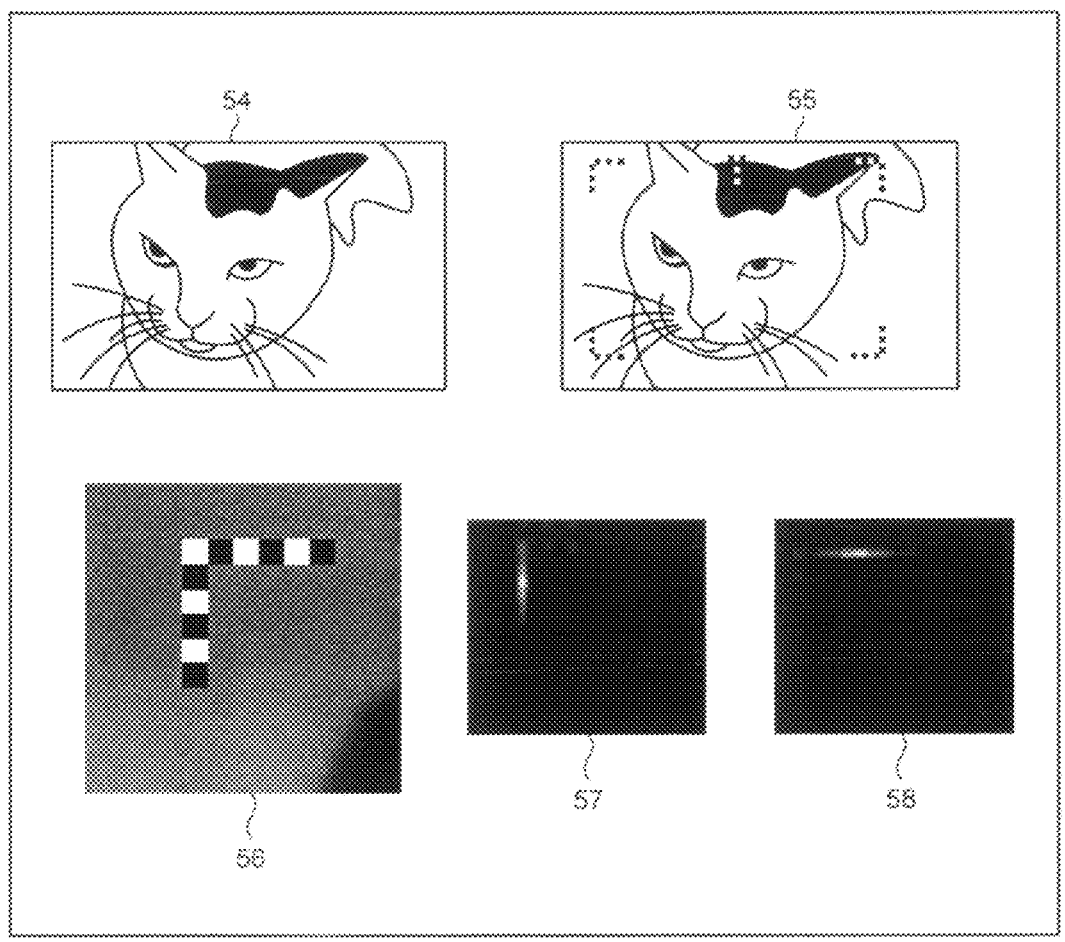
FIG. 6 is a schematic diagram illustrating an example of a marker created by the marker creating unit.

FIG. 6 is a schematic diagram illustrating an example of a marker created by the marker creating unit 140. In FIG. 6, a digital image 54 is an image obtained before markers are created and a digital image 55 is an image obtained after the markers have been created. A digital image 56 is an image obtained by enlarging the markers on the digital image 55. In the digital image 56, although the markers are not a pure white image (pixel value 255) nor a pure black image (pixel value 0), it is possible to detect markers if the marker creating unit 140 creates a characteristic pattern in which, for example, a white image and a black image cyclically appear.

A digital image 57 is an image obtained when frequency analysis is performed on the digital image 56 in the vertical direction. A digital image 58 is an image obtained when frequency analysis is performed on the digital image 56 in the lateral direction. As illustrated in the digital images 56 and 57, if the frequency analysis is performed on the digital image 55, the marker portion exhibits a strong response.

When obtaining image information (for example, see the digital image 55 in FIG. 6) including markers, the encryption processing unit 150 encrypts an image in an encrypted region specified by the markers. The encryption processing unit 150 encrypts information using a technique disclosed in, for example, Japanese Laid-open Patent Publication No. 07-254037 and embeds the encrypted information in the encrypted region. The encryption processing unit 150 outputs the encrypted image information to the image output unit 160.

When obtaining the encrypted image information from the encryption processing unit 150, the image output unit 160 outputs the obtained image information to an output apparatus (not illustrated). The output apparatus can also output the image information to a display or can also output the image information to a printer so that an image is printed. Alternatively, the output apparatus can also output the image information to another apparatus (for example, a decoding apparatus that will be described later) using wireless communication, wired communication, or the like.

Figure 7:
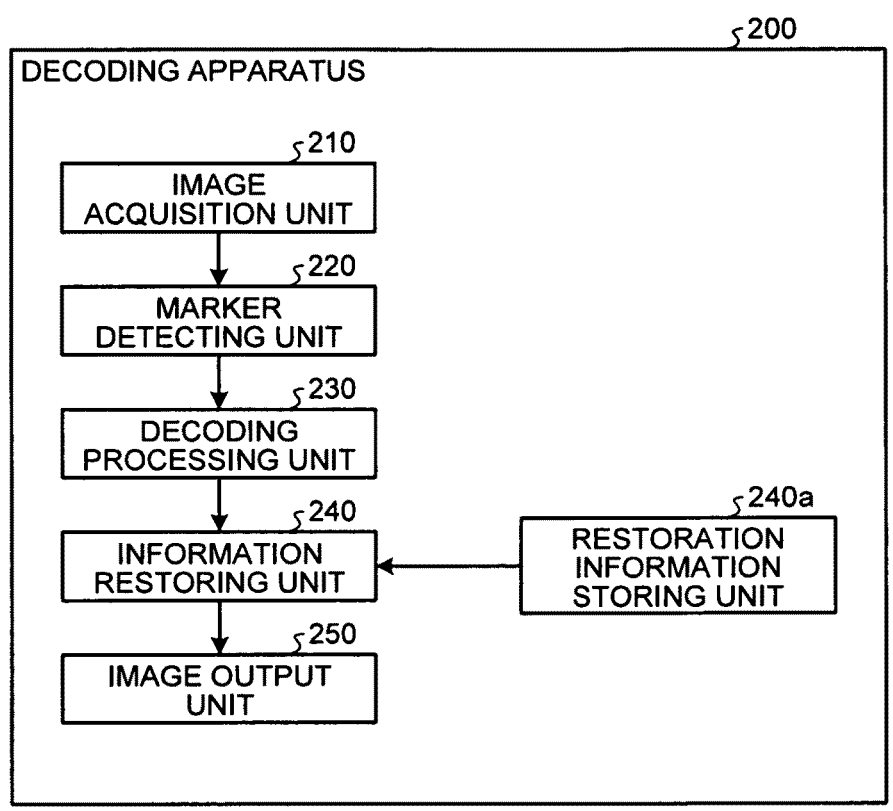
FIG. 7 is a functional block diagram illustrating the configuration of a decoding apparatus according to the first embodiment.

In the following, the configuration of the decoding apparatus according to the first embodiment will be described. FIG. 7 is a functional block diagram illustrating the configuration of a decoding apparatus according to the first embodiment. As illustrated in FIG. 7, the decoding apparatus 200 includes an image acquisition unit 210, a marker detecting unit 220, a decoding processing unit 230, an information restoring unit 240, a restoration information storing unit 240a, and an image output unit 250.

The image acquisition unit 210 acquires image information encrypted by the encryption apparatus 100. The image acquisition unit 210 outputs the acquired image information to the marker detecting unit 220.

Figure 8:
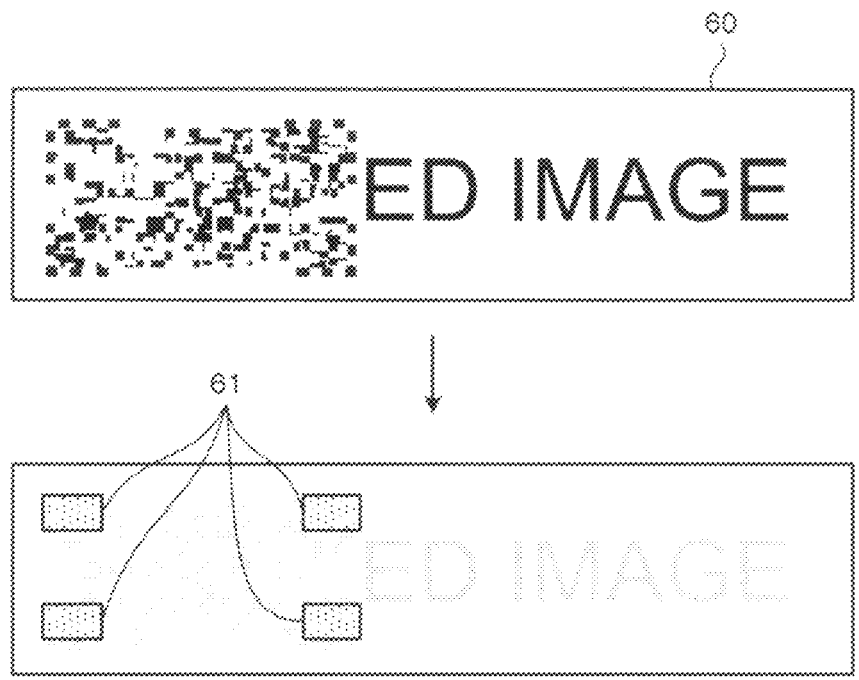
FIG. 8 is a schematic diagram illustrating a process performed by a marker detecting unit according to the first embodiment.

When obtaining the image information from the image acquisition unit 210, the marker detecting unit 220 detects a marker on an image. FIG. 8 is a schematic diagram illustrating a process performed by the marker detecting unit 220 according to the first embodiment. As illustrated in FIG. 8, if frequency analysis is performed on an image 60, the marker detecting unit 220 detects marker locations (markers) 61 corresponding to a predetermined cycle (cycle of a white image and a black image obtained when the markers are created). The marker detecting unit 220 outputs the image information and information on a region in which markers are detected (hereinafter, referred to as a "marker detection region") to the decoding processing unit 230.

When obtaining the image information and the information on the marker detection region from the marker detecting unit 220, the decoding processing unit 230 specifies, in accordance with the image information and the information on the marker detection region, an encrypted region and decodes encrypted information embedded in the specified encrypted region.

Any techniques used in the conventional technology can be used for the decoding processing unit 230 when the encrypted information is decoded. The decoding processing unit 230 outputs the decoded image information and the information on the marker detection region to the information restoring unit 240. The markers still remain in the decoded image information performed by the decoding processing unit 230.

The restoration information storing unit 240a is a storing unit that stores therein a restoration information management table. The data structure of the restoration information management table is the same as that of the restoration information management table illustrated in FIG. 4. For example, it is assumed that an information managing unit (not illustrated) obtains the restoration information management table from the encryption apparatus 100 and stores the obtained restoration information management table in the restoration information storing unit 240a.

When obtaining the image information and the information on the marker detection region from the decoding processing unit 230, the information restoring unit 240 removes a marker from an image in accordance with the restoration information stored in the restoration information storing unit 240a. The information restoring unit 240 removes the marker from the image and outputs, to the image output unit 250, image information on an image that is restored to the original image.

Specifically, the information restoring unit 240 detects, from the restoration information management table, the restoration information corresponding to the coordinates in the marker detection region and overwrites the high-order 2 bits of a pixel value in the corresponding coordinates using the detected restoration information.

Figure 9:
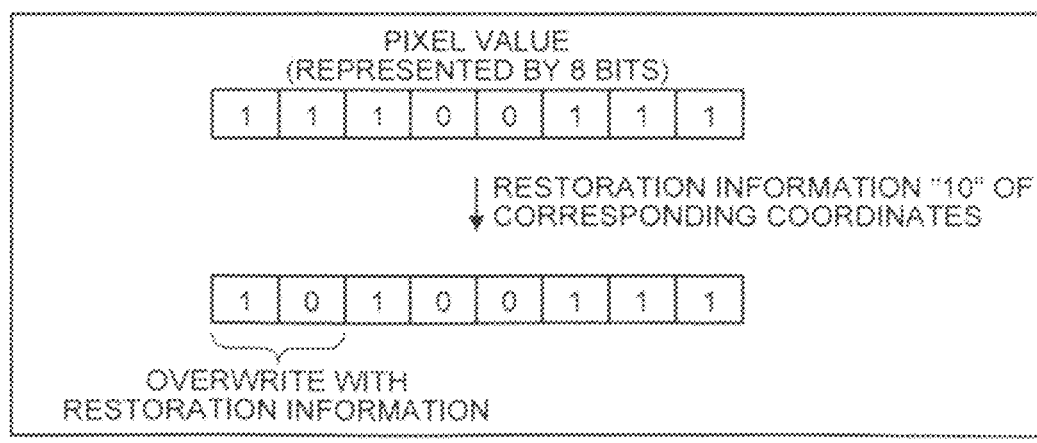
FIG. 9 is a schematic diagram illustrating a process performed by an information restoring unit according to the first embodiment.

FIG. 9 is a schematic diagram illustrating a process performed by the information restoring unit 240 according to the first embodiment. Here, if a pixel value of the coordinates is defined as "11100111" and restoration information of the corresponding coordinates is defined as "10", as illustrated in FIG. 9, the high-order 2 bits of the pixel value "11100111" is overwritten with the restoration information "10". By performing the process illustrated in FIG. 9 on the entire marker detection region, the information restoring unit 240 can remove the markers from the image.

When obtaining the restored image information from the information restoring unit 240, the image output unit 250 outputs the obtained image information to an output apparatus (not illustrated). The output apparatus can also output the image information to a display or can also output the image information to a printer so that an image is printed. Alternatively, the output apparatus can also output the image information to another apparatus using wireless communication, wired communication, or the like.

Figure 10:
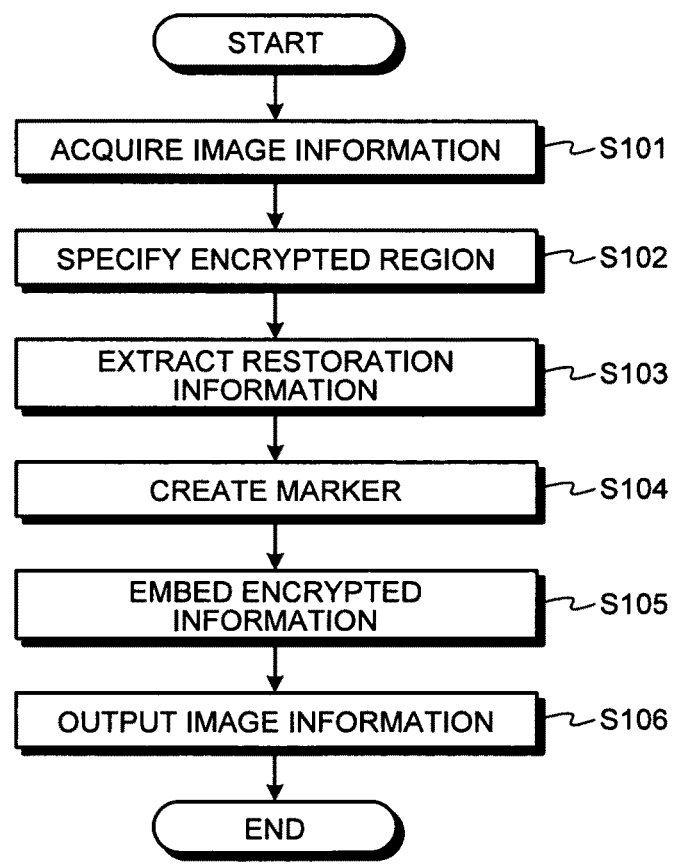
FIG. 10 is a flowchart illustrating the flow of a process performed by the encryption apparatus according to the first embodiment.

In the following, the flow of the process performed by the encryption apparatus 100 according to the first embodiment will be described. FIG. 10 is a flowchart illustrating the flow of a process performed by the encryption apparatus 100 according to the first embodiment. As illustrated in FIG. 10, with the encryption apparatus 100, the image acquisition unit 110 acquires image information (Step S101) and the region specifying unit 120 specifies an encrypted region (Step S102).

Subsequently, the restoration information extracting unit 130 obtains restoration information for restoring a pixel in a region in which a marker is arranged (Step S103). The marker creating unit 140 creates the marker in the region corresponding to a marker arrangement region on the image (Step S104).

Then, the encryption processing unit 150 embeds encrypted information in the encrypted region specified by the marker (Step S105). The image output unit 160 outputs the image information (Step S106).

Figure 11:
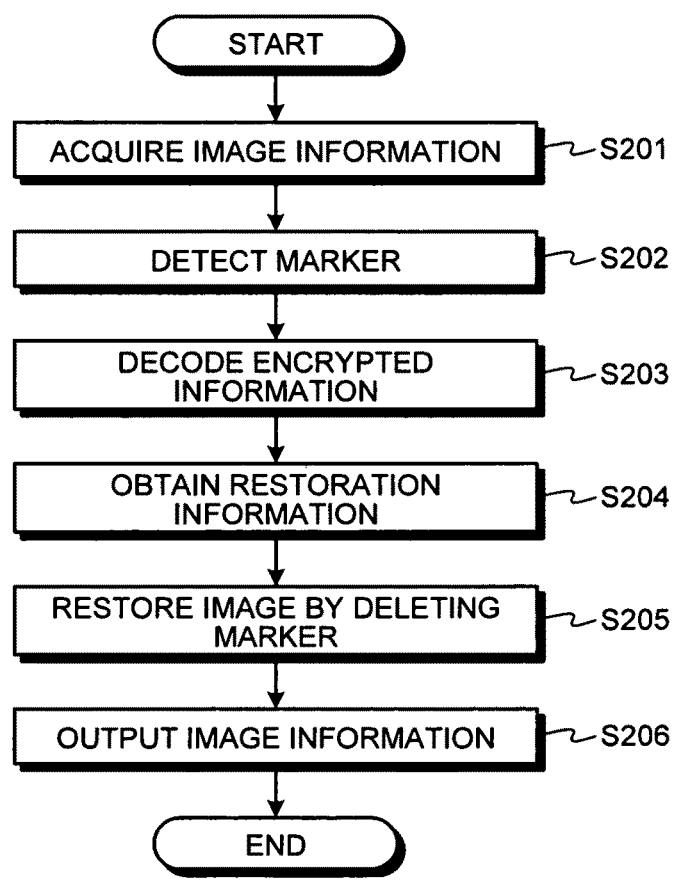
FIG. 11 is a flowchart illustrating the flow of a process performed by the decoding apparatus according to the first embodiment.

In the following, the flow of the process performed by the decoding apparatus 200 according to the first embodiment will be described. FIG. 11 is a flowchart illustrating the flow of a process performed by the decoding apparatus 200 according to the first embodiment. As illustrated in FIG. 11, with the decoding apparatus 200, the image acquisition unit 210 acquires image information (Step S201), and the marker detecting unit 220 detects a marker from an image (Step S202).

Subsequently, the decoding processing unit 230 specifies an encrypted region in accordance with a marker detection location and decodes the encrypted information contained in the encrypted region (Step S203). The information restoring unit 240 obtains the restoration information (Step S204).

Then, the information restoring unit 240 restores the image by deleting the marker in accordance with the restoration information (Step S205), and the image output unit 250 outputs the restored image information (Step S206).

As described above, when the encryption apparatus 100 according to the first embodiment creates a marker, instead of saving all of the pieces of image information in a region in which a marker is created, the encryption apparatus 100 extracts each of the pixel values in the region and allows the storing unit to save the high-order 2 bits of the extracted pixel values as the restoration information. Then, the encryption apparatus 100 creates a marker by changing the high-order 2 bits of each pixel value in a region in which the marker is created and embeds encrypted information in an encrypted region specified by the marker.

In contrast, when the decoding apparatus 200 decodes the encrypted information, the decoding apparatus 200 detects the marker from the digital image and decodes the encrypted information in the encrypted region specified by the marker. Then, by overwriting 2 bits contained in the restoration information with the high-order 2 bits of each pixel value of the marker, the decoding apparatus 200 restores the image in the region in which the marker has been created.

As described above, the encryption apparatus 100 and the decoding apparatus 200 according to the first embodiment extract, as restoration information, a part of the pixel value in a region in which a marker is created and restore the marker to the original image in accordance with the extracted restoration information. Accordingly, it is possible to completely restore the encrypted image without suppressing the amount of available memory resources or the like.

[a] Second Embodiment

The encryption apparatus 100 according to the first embodiment creates a marker by extracting the high-order n bits (n is a natural number. Hereinafter, a description is given by representing the high-order n bits as the high-order 2 bits) of a pixel value in a marker arrangement region as restoration information and overwriting the high-order 2 bits of the pixel value in the marker arrangement region with "1" or "0". However, the method for creating the restoration information and the marker is not limited to the first embodiment.

An encryption apparatus according to a second embodiment determines whether a neighboring region of the marker arrangement region is white or black. If the result of the determination is that the neighboring region is white or black, the encryption apparatus creates a marker by inverting a pixel value in a marker region. When creating the marker by inverting the pixel value, the encryption apparatus extracts, as restoration information, information indicating that the pixel value is inverted.

Furthermore, if the neighboring region of the marker arrangement region is neither white nor black, in a similar manner as in the first embodiment, the encryption apparatus according to the second embodiment creates a marker by extracting, as restoration information, the high-order n bits of a pixel value and overwriting the high-order 2 bits of the pixel value in the marker arrangement region with "1" or "0".

Figure 12:
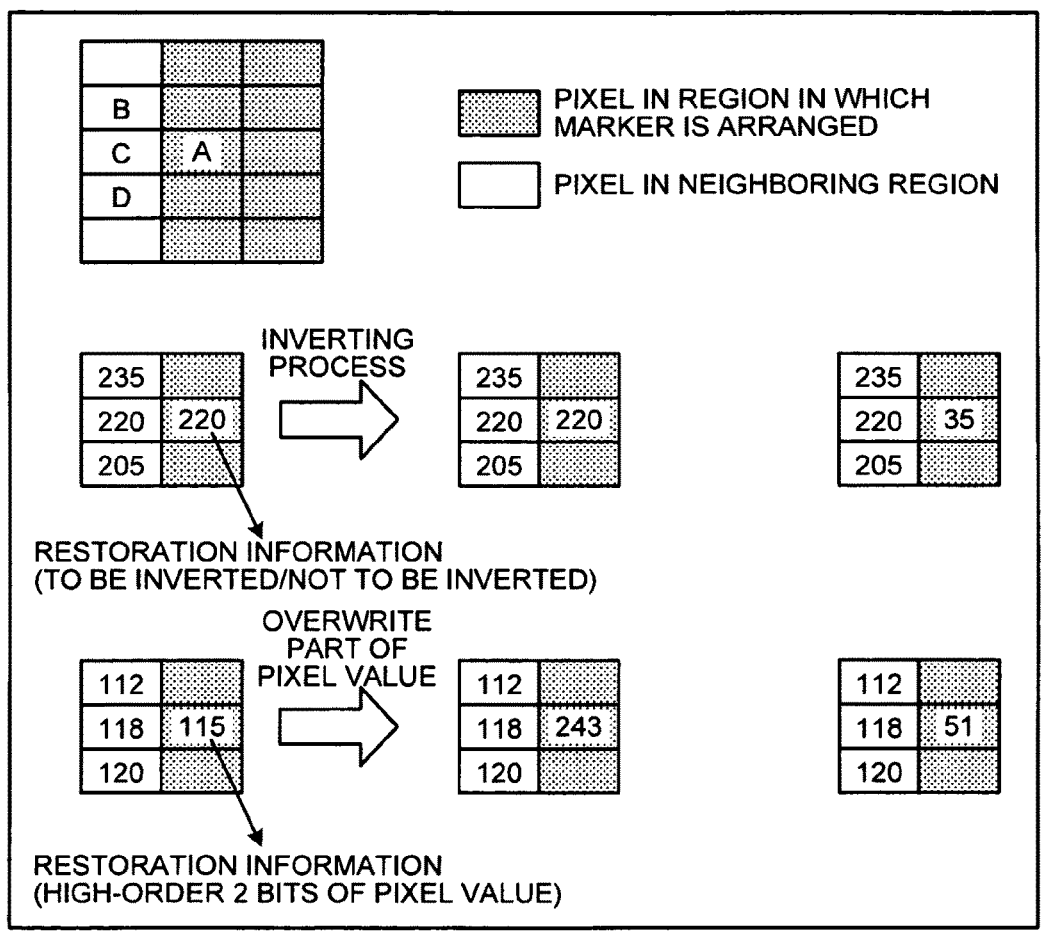
FIG. 12 is a schematic diagram illustrating the outline of an encryption apparatus according to a second embodiment.

FIG. 12 is a schematic diagram illustrating the outline of the encryption apparatus according to a second embodiment. In FIG. 12, a half-tone dot meshing portion is defined as a marker arrangement region, and a portion other than the half-tone dot meshing portion is defined as a neighboring region. In the following, a description will be given by focusing on a pixel A and pixels B, C, and D.

First, as illustrated in the middle portion of FIG. 12, a case will be described in which a pixel value of the pixel A is "220" and the pixel values of the pixels B, C, and D are "235", "220", and "205", respectively. The encryption apparatus determines whether the pixels B, C, and D are white (for example, when the pixel value is equal to or higher than 192) or black (for example, when the pixel value is lower than 64).

Because the pixel values of the pixels B, C, and D are higher than "192" (or, if there is a predetermined number of pixels in the neighboring region that have a pixel value equal to or higher than "192"), the encryption apparatus determines to invert the pixel value of the pixel A and creates, as restoration information, information indicating that the pixel value has been inverted. Then, the encryption apparatus inverts the pixel value "220" of the pixel A to "35".

In a natural image, if a neighboring region is white, in many cases, a pixel in a marker arrangement region is also white. Accordingly, by inverting such a pixel, the pixel becomes black; therefore, white and black portions that are the characteristic pattern of the marker are created without overwriting, which is in contrast to the first embodiment, the high-order n bits of the pixel value with "0". Consequently, it is possible to create a marker.

Similarly, in a natural image, if a neighboring region is black, in many cases, a pixel in a marker arrangement region is also black. Accordingly, by inverting such a pixel, the pixel becomes white; therefore white and black portions that are the characteristic pattern of the marker are created without overwriting, which is in contrast to the first embodiment, the high-order n bits of the pixel value with "1". Consequently, it is possible to create a marker.

In the following, as illustrated in the lower portion of FIG. 12, a case will be described in which a pixel value of the pixel A is "115" and the pixel values of the pixels B, C, and D are "112", "118", and "120", respectively. The encryption apparatus determines whether the pixels B, C, and D are white (for example, the pixel value is equal to or higher than 192) or black (for example, the pixel value is equal to or lower than 64).

Because the pixel value of the pixels B, C, and D are lower than "192" and equal to or higher than "64", the encryption apparatus determines not to invert the pixel value of the pixel A and extracts the high-order n-bits of the pixel value as restoration information. Then, the encryption apparatus creates a marker by overwriting the high-order n bits of the pixel value "115" of the pixel A and changing the pixel value to "243" or "51".

The encryption apparatus according to the second embodiment creates a marker by performing the process illustrated in FIG. 12 on the entire marker arrangement region. Because the information indicating that a pixel value has been inverted can be represented by 1-bit information, such as "1: inverted", it is possible to further reduce the amount of data in the restoration information.

Figures 13, 14:
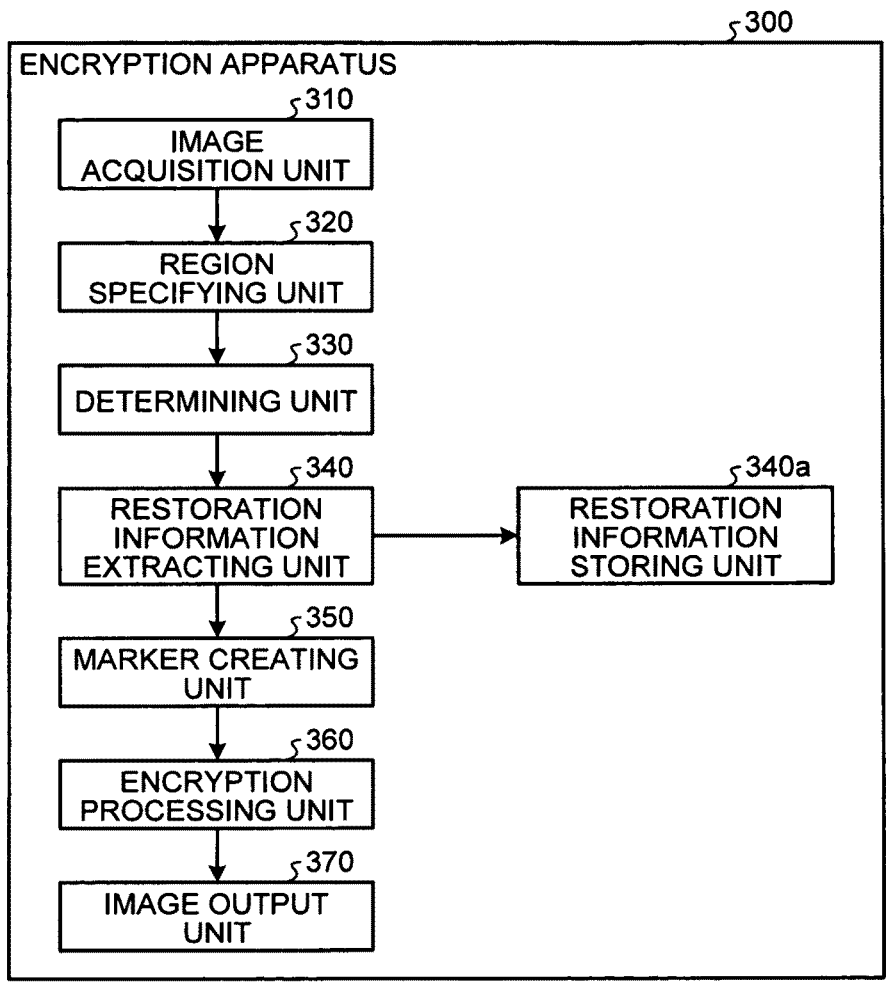
FIG. 13 is a functional block diagram illustrating the configuration of the encryption apparatus according to the second embodiment.
FIG. 14 is a schematic diagram illustrating an example of the data structure of a restoration information management table according to the second embodiment.

In the following, the configuration of the encryption apparatus according to the second embodiment will be described. FIG. 13 is a functional block diagram illustrating the configuration of an encryption apparatus 300 according to the second embodiment. As illustrated in FIG. 13, the encryption apparatus 300 includes an image acquisition unit 310, a region specifying unit 320, a determining unit 330, a restoration information extracting unit 340, a restoration information storing unit 340a, a marker creating unit 350, an encryption processing unit 360, and an image output unit 370.

The image acquisition unit 310 includes a scanning apparatus, such as a scanner, that scans information from a storage medium. The image acquisition unit 310 acquires image information, for example, stored in the storage medium or scanned by the scanner and outputs the acquired image information to the region specifying unit 320.

When obtaining the image information from the image acquisition unit 310, the region specifying unit 320 specifies a region on an image in which a marker is arranged (created), i.e., the marker arrangement region. The region specifying unit 320 outputs both the image information and information on the marker arrangement region to the determining unit 330.

When obtaining the image information and the information on the marker arrangement region from the region specifying unit 320, the determining unit 330 determines, from among pixels in the marker arrangement region, the location of a pixel whose pixel value is inverted. Specifically, the determining unit 330 scans image information and detects, from the marker arrangement region, a pixel close to a pixel in a neighboring region whose pixel value is lower than 64 (black) or equal to or higher than 192 (white) (see FIG. 12). Then, the determining unit 330 outputs location information on the detected pixel, the image information, and the information on the marker arrangement region to the restoration information extracting unit 340.

When obtaining the location information, the image information, and information on the marker arrangement region from the determining unit 330, the restoration information extracting unit 340 extracts, in accordance with the obtained information, restoration information for restoring a pixel in a region in which a marker is arranged.

The restoration information extracting unit 340 determines, in accordance with the location information, the coordinates of the pixel whose pixel value is to be inverted and stores, in an associated manner in the restoration information storing unit 340a, the coordinates of the pixel whose pixel value is to be inverted and information indicating that the pixel value is to be inverted (for example, represented by a bit "1").

Subsequently, the restoration information extracting unit 340 determines, in accordance with the location information, the coordinates of a pixel whose pixel value is not to be inverted. Then, the restoration information extracting unit 340 obtains a pixel value from the determined pixel and extracts the high-order 2 bits of the obtained pixel value as the restoration information. For example, if a pixel value of the coordinates is 167 ("10100111" represented in binary), the restoration information extracting unit 340 extracts the high-order 2 bits, i.e., "11" as the restoration information.

Then, the restoration information extracting unit 340 associates the restoration information including the high-order 2 bits and the coordinates of the image from which the restoration information is extracted and stores them in the restoration information storing unit 340a. Furthermore, the restoration information extracting unit 340 outputs the location information, the image information, and the information on the marker arrangement region to the marker creating unit 350.

The restoration information storing unit 340a is a storing unit that stores therein a restoration information management table. FIG. 14 is a schematic diagram illustrating an example of the data structure of a restoration information management table according to the second embodiment. As illustrated in FIG. 14, the restoration information storing unit 340a stores therein, in an associated manner, coordinates of the image (the coordinates in the marker arrangement region) and the restoration information by using the restoration information management table.

Furthermore, as illustrated in FIG. 14, the restoration information that corresponds to a pixel of the coordinates whose pixel value is not to be inverted contains the high-order 2-bit information, whereas the restoration information that corresponds to a pixel of the coordinates whose pixel value is to be inverted contains "1" (image is to be inverted).

When obtaining the location information, the image information, and the information on the marker arrangement region from the restoration information extracting unit 340, the marker creating unit 350 creates a marker in a region on an image corresponding to the marker arrangement region. First, the marker creating unit 350 creates a marker by determining, in accordance with the location information, the coordinates of a pixel whose pixel value is to be inverted and by inverting the pixel value of the pixel of the determined coordinates.

Subsequently, the marker creating unit 350 creates a marker by determining, in accordance with the location information, the coordinates of the pixel whose pixel value is not to be inverted and by changing the pixel of the determined coordinates to white or black. The process for changing the pixel (image) to white or black is the same as that performed by the marker creating unit 140 described in the first embodiment; therefore, a description thereof will be omitted. The marker creating unit 350 outputs the image information on the created marker to the encryption processing unit 360.

When obtaining the image information containing the marker, the encryption processing unit 360 encrypts an image in an encrypted region specified by the marker. The encryption processing unit 360 encrypts information using a technique disclosed in, for example, Japanese Laid-open Patent Publication No. 07-254037 and embeds the encrypted information in the encrypted region. The encryption processing unit 360 outputs the encrypted image information to the image output unit 370.

When obtaining the encrypted image information from the encryption processing unit 360, the image output unit 370 outputs the obtained image information to an output apparatus (not illustrated). The output apparatus can also output the image information to a display or can also output the image information to a printer so that an image is printed. Alternatively, the output apparatus can also output the image information to another apparatus (for example, a decoding apparatus that will be described later) using wireless communication, wired communication, or the like.

Figure 15:
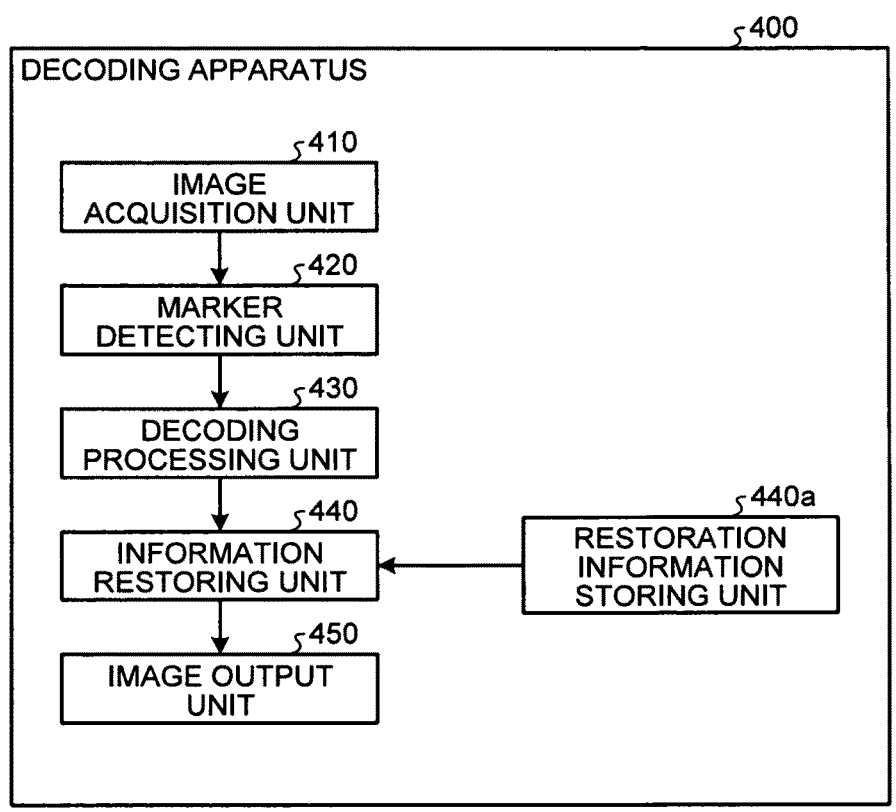
FIG. 15 is a functional block diagram illustrating the configuration of a decoding apparatus according to the second embodiment.

In the following, the configuration of a decoding apparatus according to the second embodiment will be described. FIG. 15 is a functional block diagram illustrating the configuration of a decoding apparatus 400 according to the second embodiment. As illustrated in FIG. 15, the decoding apparatus includes an image acquisition unit 410, a marker detecting unit 420, a decoding processing unit 430, an information restoring unit 440, a restoration information storing unit 440a, and an image output unit 450.

The image acquisition unit 410 acquires image information encrypted by the encryption apparatus 300. The image acquisition unit 410 outputs the acquired image information to the marker detecting unit 420.

When obtaining the image information from the image acquisition unit 410, the marker detecting unit 420 detects a marker on an image. The specific description of the marker detecting unit 420 is the same as that of the marker detecting unit 220 described in the first embodiment. The marker detecting unit 420 outputs information on a region in which a marker is detected (hereinafter, referred to as a "marker detection region") and the image information to the decoding processing unit 430.

When obtaining the image information and the information on the marker detection region from the marker detecting unit 420, the decoding processing unit 430 specifies an encrypted region in accordance with the image information and the information on the marker detection region and decodes encrypted information embedded in the specified encrypted region.

The restoration information storing unit 440a is a storing unit that stores therein a restoration information management table. The data structure of the restoration information management table is the same as that illustrated in FIG. 14. For example, it is assumed that an information managing unit (not illustrated) obtains the restoration information management table from the encryption apparatus 300 and allows the restoration information storing unit 440a to store the obtained restoration information management table.

When obtaining the image information and the information on the marker detection region from the decoding processing unit 430, the information restoring unit 440 removes the marker from the image in accordance with the restoration information stored in the restoration information storing unit 440a. The information restoring unit 440 removes the marker from the image and outputs, to the image output unit 450, image information on an image that is restored to the original image.

The information restoring unit 440 scans the restoration information management table and determines the coordinates corresponding to the restoration information indicating "1 (image is to be inverted)". Then, the information restoring unit 440 inverts a pixel value in a marker detection region corresponding to the determined coordinates.

Subsequently, the information restoring unit 440 scans the restoration information management table and determines the coordinates corresponding to the restoration information not indicating "1". Then, the information restoring unit 440 overwrites the high-order 2 bits of the pixel value in the marker detection region corresponding to the determined coordinates with the corresponding restoration information. By performing the above-described process, i.e., the process for inverting a pixel value and the process for overwriting the high-order 2 bits with the restoration information on the entire marker detection region, the information restoring unit 440 can remove a marker from the image.

When obtaining the image information restored by the information restoring unit 440, the image output unit 450 outputs the obtained image information to an output apparatus (not illustrated). The output apparatus can also output the image information to a display or can also output the image information to a printer so that an image is printed. Alternatively, the output apparatus can also output the image information to another apparatus using wireless communication, wired communication, or the like.

Figure 16:
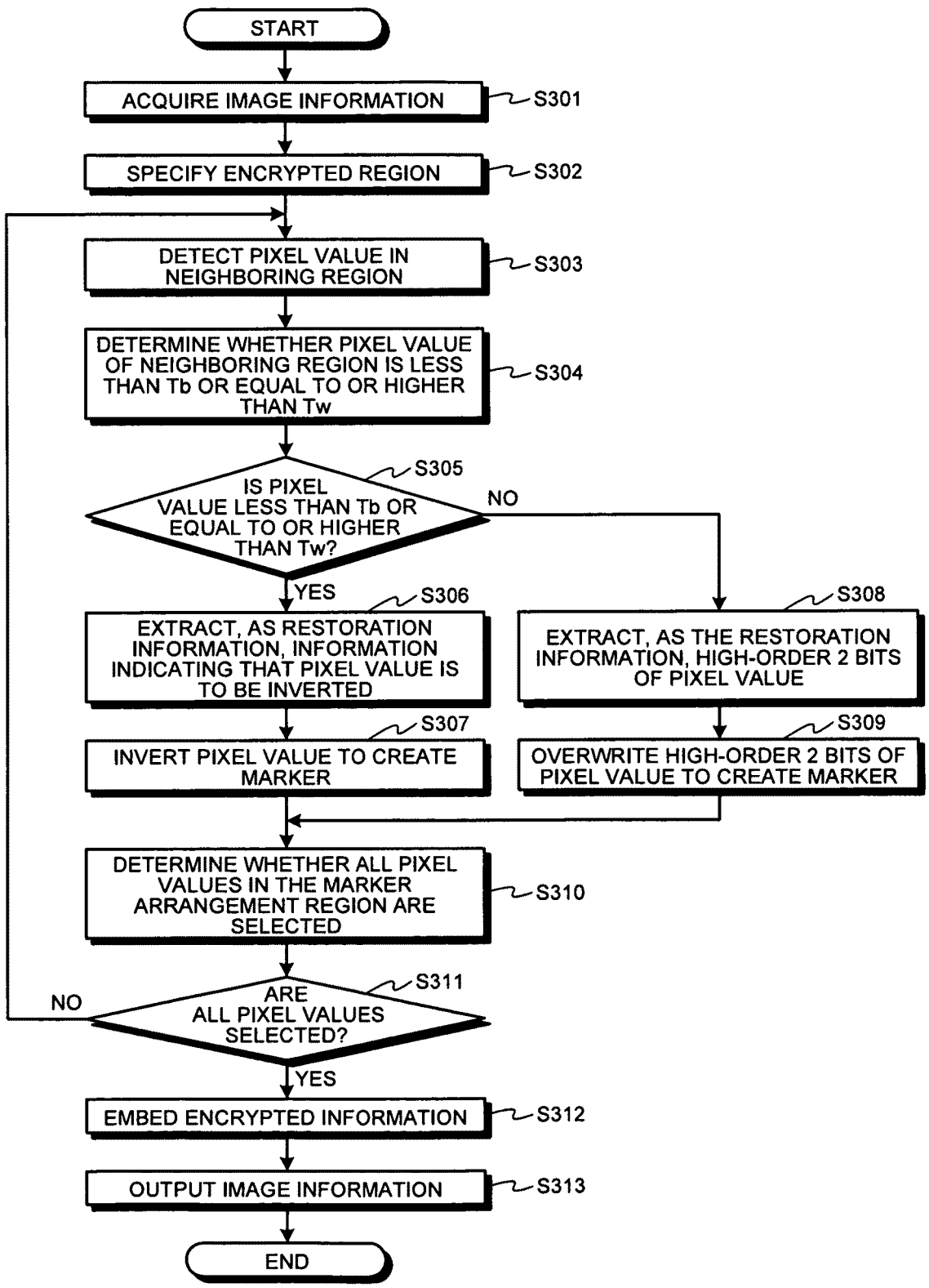
FIG. 16 is a flowchart illustrating the flow of a process performed by the encryption apparatus according to the second embodiment.

In the following, the flow of a process performed by the encryption apparatus 300 according to the second embodiment will be described. FIG. 16 is a flowchart illustrating the flow of a process performed by the encryption apparatus 300 according to the second embodiment. As illustrated in FIG. 16, with the encryption apparatus 300, the image acquisition unit 310 acquires image information (Step S301) and the region specifying unit 320 specifies an encrypted region (Step S302).

Subsequently, the determining unit 330 detects a pixel value of a neighboring region (Step S303) and determines whether the pixel value of the neighboring region is lower than threshold Tb (pixel value 64) or equal to or higher than threshold Tw (pixel value 192) (Step S304).

Then, if the pixel value of the neighboring region is lower than Tb or equal to or higher than Tw (Yes at Step S305), the restoration information extracting unit 340 extracts, as restoration information, information indicating that the pixel value is to be inverted (Step S306) and the marker creating unit 350 inverts the pixel value to create a marker (Step S307). Then, the process proceeds to Step S310.

In contrast, if the condition at Step S305 is not satisfied (No at Step S305), the restoration information extracting unit 340 extracts, as the restoration information, the high-order 2 bits of the pixel value (Step S308) and the marker creating unit 350 overwrites the high-order 2 bits of the pixel value with "1" or "0" to create a marker (Step S309).

Then, the encryption apparatus 300 determines whether all of the pixel values in the marker arrangement region are selected (Step S310). If not all of the pixel values are selected (No at Step S311), the process proceeds to Step S303.

In contrast, if all of the pixel value in the marker arrangement region are selected (Yes at Step S311), the encryption processing unit 360 embeds encrypted information in the encrypted region specified by the marker (Step S312) and the image output unit 370 outputs image information (Step S313).

In the following, the flow of a process performed by the decoding apparatus 400 according to the second embodiment will be described. FIG. 17 is a flowchart illustrating a process performed by the decoding apparatus 400 according to the second embodiment. As illustrated in FIG. 17, with the decoding apparatus 400, the image acquisition unit 410 acquires image information (Step S401) and the marker detecting unit 420 detects a marker from an image (Step S402).

Subsequently, the decoding processing unit 430 specifies an encrypted region in accordance with the detected location of the marker and decodes encrypted information contained in the encrypted region (Step S403). The information restoring unit 440 then obtains restoration information (Step S404).

Then, by deleting the marker in accordance with the restoration information, the information restoring unit 440 restores the image (Step S405). The image output unit 450 then outputs the restored image (Step S406).

As described above, when the encryption apparatus according to the second embodiment creates a marker, instead of saving all the pieces of the image information in a region in which the marker is created, the encryption apparatus determines whether a neighboring region of a marker arrangement region is white or black. If the neighboring region is white or black, by inverting a pixel value in a marker region, the marker is created. Furthermore, when creating a marker by inverting the pixel value, the encryption apparatus extracts, as restoration information, information indicating that the pixel value is to be inverted. The restoration information contains information only indicating that an image has been inverted, e.g., "1"; therefore, it is possible to further reduce the memory area needed for storing the restoration information.

Third Embodiment

[a] Third Embodiment

A third embodiment will be described from the viewpoint of extracting restoration information from the difference value (the difference value is not restoration information).

In the first and second embodiments, a marker is created by overwriting the high-order 2 bits of a pixel value in a marker arrangement region with "1" or "0" or by inverting a pixel value; however, the method of creating a marker is not limited to the first and second embodiments.

An encryption apparatus according to the third embodiment can also create a marker by calculating the difference value between adjacent pixel values in a marker arrangement region and by overwriting, using the method described in the first embodiment, the high-order n bits of the difference value with "1" or "0". In such a case, the encryption apparatus extracts the high-order n bits of the difference value as restoration information.

Alternatively, the encryption apparatus according to the third embodiment can also create a marker by calculating the difference value between adjacent pixel values in a marker arrangement region and by inverting, using the method described in the second embodiment, the difference value. In such a case, the encryption apparatus extracts, as restoration information, information indicating whether the difference value has been inverted.

Here, for convenience of description, a case will be described in which the high-order 2 bits of the difference value are extracted as restoration information. FIG. 18 is a schematic diagram illustrating the outline of the encryption apparatus according to a third embodiment. For the sake of convenience, it is assumed that a digital image 65 in a marker arrangement region includes 8 pixels that can represent pixel value by 8 bits (0 to 255).

If the pixels in the digital image 65 are represented by pixel values, they can be represented by pixel values 66. The encryption apparatus creates pixel values 67 by calculating the difference values between adjacent pixel values in the pixel values 66. For example, by calculating the difference value between a first pixel value "167" and a second pixel value "106" in the pixel values 66, a first pixel value "61" in the pixel values 67 can be calculated.

Then, the encryption apparatus extracts restoration information from the created pixel values 67 and creates a marker. Specifically, the encryption apparatus creates a marker by saving each of the high-order 2 bits of the pixel values 67 as restoration information in a storing unit and by overwriting each of the high-order 2 bits of the pixel values 67 with "1" or "0".

FIG. 19 is a schematic diagram illustrating an example of an image created by calculating the difference values. A digital image 70 in FIG. 19 is the original image. A digital image 71 is an image created by calculating the difference values between adjacent pixel values of the digital image 70.

In a histogram 70a of pixel values of the digital image 70, the pixel values are widely distributed. In contrast, in a histogram 71a of pixel values of the digital image 71, the pixel values are concentrated at the left end and the right end. In particular, in many cases, adjacent pixel values are almost the same in a natural image; therefore, a histogram tends to become the histogram 71a. Accordingly, by changing the high-order 2 bits of the difference value, it is possible for a marker to be used.

Figures 20, 21:
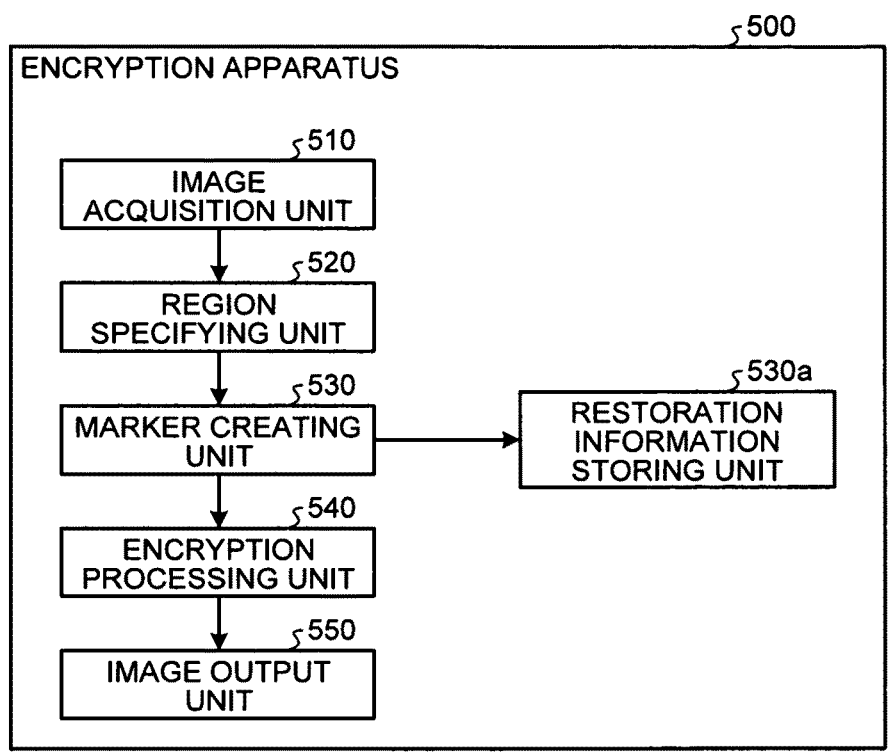
FIG. 20 is a functional block diagram illustrating the configuration of the encryption apparatus according to the third embodiment.
FIG. 21 is a schematic diagram illustrating an example of the data structure of a restoration information management table according to the third embodiment.

In the following, the configuration of the encryption apparatus according to the third embodiment will be described. FIG. 20 is a functional block diagram illustrating the configuration of an encryption apparatus 500 according to the third embodiment. As illustrated in FIG. 20, the encryption apparatus 500 includes an image acquisition unit 510, a region specifying unit 520, a marker creating unit 530, a restoration information storing unit 530a, an encryption processing unit 540, and an image output unit 550.

The image acquisition unit 510 includes a scanning apparatus, such as a scanner, that scans information from a storage medium. The image acquisition unit 510 acquires image information, for example, stored in the storage medium or scanned by the scanner and outputs the acquired image information to the region specifying unit 520.

When obtaining the image information from the image acquisition unit 510, the region specifying unit 520 specifies a region on an image in which a marker is arranged (created), i.e., the marker arrangement region. The region specifying unit 520 outputs both the image information and information on the marker arrangement region to the marker creating unit 530.

When obtaining the image information and the information on the marker arrangement region from the region specifying unit 520, the marker creating unit 530 creates a marker in the marker arrangement region, on an image, in a region corresponding to the marker arrangement region. As described in FIG. 18, the marker creating unit 530 creates a marker by calculating the difference value between pixel values in the marker arrangement region and by overwriting the high-order 2 bits of the calculated difference value with "1" or "0".

For example, if an original pixel value is A, an adjacent pixel value is B, a difference value is C, the marker creating unit 530 calculates each difference value using Equation (1) below:

$$C = A - B \quad (1)$$

However, if the difference value C is lower than zero, the marker creating unit 530 adds 256 to the difference value C. The marker creating unit 530 outputs image information on the created marker to the encryption processing unit 540.

Furthermore, the marker creating unit 530 extracts the high-order 2 bits of the difference value as restoration information, associates the restoration information with the coordinates of the image, and stores it in the restoration information storing unit 530a.

The restoration information storing unit 530a is a storing unit that stores therein a restoration information management table. FIG. 21 is a schematic diagram illustrating an example of the data structure of a restoration information management table according to the third embodiment. As illustrated in FIG. 21, the restoration information storing unit 530a stores therein, in an associated manner, the coordinates of the image and the restoration information.

When obtaining the image information including a marker, the encryption processing unit 540 encrypts an image in an encrypted region specified by the marker. The encryption processing unit 540 encrypts information using a technique disclosed in, for example, Japanese Laid-open Patent Publication No. 07-254037 and embeds the encrypted information in the encrypted region. The encryption processing unit 540 outputs the encrypted image information to the image output unit 550.

When obtaining the encrypted image information from the encryption processing unit 540, the image output unit 550 outputs the obtained image information to an output apparatus (not illustrated). The output apparatus can also output the image information to a display or can also output the image information to a printer so that an image is printed. Alternatively, the output apparatus can also output the image information to another apparatus (for example, a decoding apparatus that will be described later) using wireless communication, wired communication, or the like.

Figure 22:
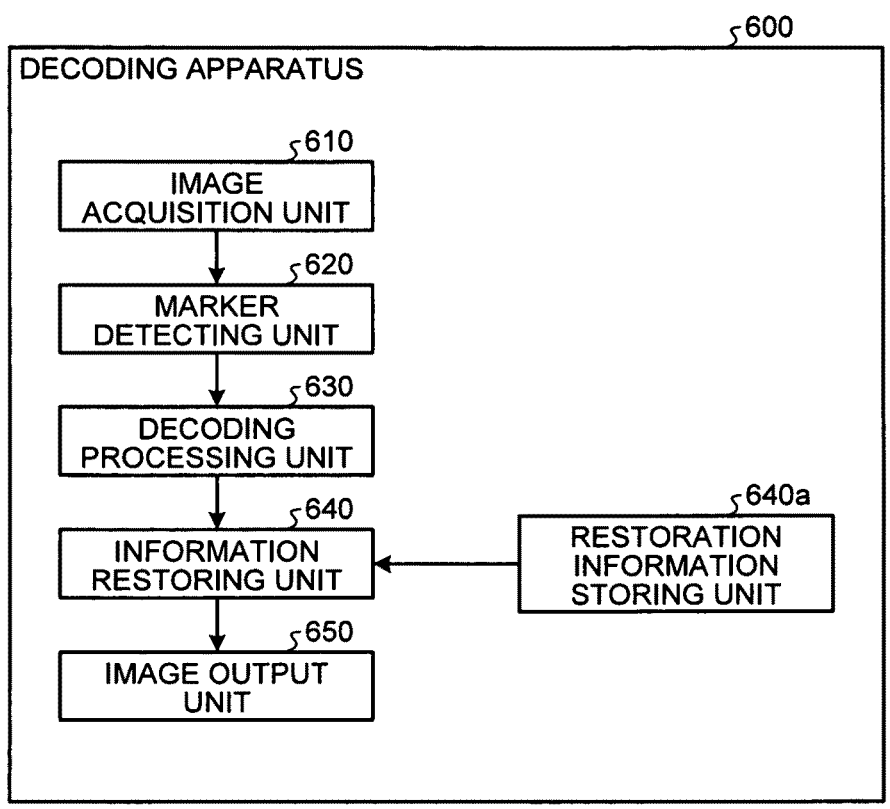
FIG. 22 is a functional block diagram illustrating the configuration of a decoding apparatus according to the third embodiment.

In the following, the configuration of a decoding apparatus according to the third embodiment will be described. FIG. 22 is a functional block diagram illustrating the configuration of a decoding apparatus 600 according to the third embodiment. As illustrated in FIG. 22, the decoding apparatus 600 includes an image acquisition unit 610, a marker detecting unit 620, a decoding processing unit 630, an information restoring unit 640, a restoration information storing unit 640a, and an image output unit 650.

The image acquisition unit 610 acquires image information encrypted by the encryption apparatus 500. The image acquisition unit 610 outputs the acquired image information to the marker detecting unit 620.

When obtaining the image information from the image acquisition unit 610, the marker detecting unit 620 detects a marker on an image. The specific description of the marker detecting unit 620 is the same as that of the marker detecting unit 220 described in the first embodiment. The marker detecting unit 620 outputs both information on a region in which a marker is detected, i.e., on a marker detection region, and image information to the decoding processing unit 630.

When obtaining the image information and the information on the marker detection region from the marker detecting unit 620, the decoding processing unit 630 specifies an encrypted region in accordance with the image information and the information on the marker detection region and decodes encrypted information embedded in the specified encrypted region.

The restoration information storing unit 640a is a storing unit that stores therein a restoration information management table. The data structure of the restoration information management table is the same as that illustrated in FIG. 21. For example, it is assumed that an information managing unit (not illustrated) obtains the restoration information management table from the encryption apparatus 500 and allows the restoration information storing unit 640a to store the obtained restoration information management table.

When obtaining the image information and the information on the marker detection region from the decoding processing unit 630, the information restoring unit 640 decodes the difference value in accordance with the restoration information stored in the restoration information storing unit 640a and removes the marker from the image using the decoded difference value. The information restoring unit 640 removes the marker from the image and outputs, to the image output unit 650, image information on an image that is restored to the original image.

Specifically, if an original pixel value is A, an adjacent pixel value is B, and a difference value is C, the information restoring unit calculates the original pixel value A using the Equation (2) below:

$$A = B + C \qquad (2)$$

Then, the information restoring unit restores the image by overwriting the calculated pixel value A. However, if the original pixel value A is equal to or higher than 256, the information restoring unit subtracts 256 from the pixel value A.

When obtaining the restored image information from the information restoring unit 640, the image output unit 650 outputs the obtained image information to an output apparatus (not illustrated). The output apparatus can also output the image information to a display or can also output the image information to a printer so that an image is printed. Alternatively, the output apparatus can also output the image information to another apparatus using wireless communication, wired communication, or the like.

Figure 23:
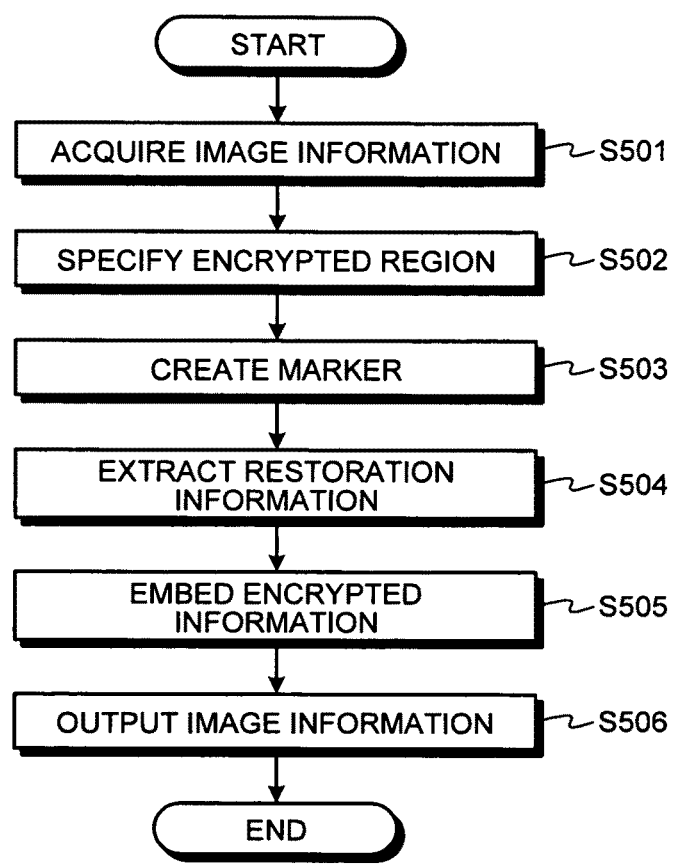
FIG. 23 is a flowchart illustrating a process performed by the encryption apparatus according to the third embodiment.

In the following, the flow of a process performed by the encryption apparatus 500 according to the third embodiment will be described. FIG. 23 is a flowchart illustrating a process performed by the encryption apparatus 500 according to the third embodiment. As illustrated in FIG. 23, with the encryption apparatus 500, the image acquisition unit 510 acquires image information (Step S501) and the region specifying unit 520 specifies an encrypted region (Step S502).

Subsequently, the marker creating unit 530 calculates the difference value between adjacent pixel values and creates a marker in accordance with the calculated difference value (Step S503) and extracts the high-order 2 bits of the difference value as restoration information (Step S504).

Then, the encryption processing unit 540 embeds encrypted information in the encrypted region specified by the marker (Step S505) and the image output unit 550 outputs image information (Step S506).

Figure 24:
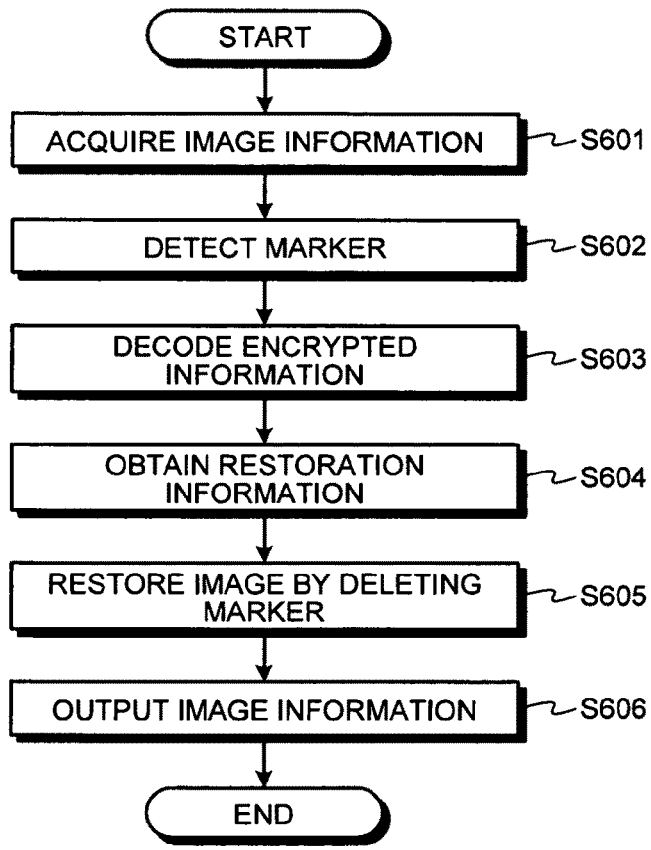
FIG. 24 is a flowchart illustrating a process performed by the decoding apparatus according to the third embodiment.

In the following, the flow of a process performed by the decoding apparatus 600 according to the third embodiment will be described. FIG. 24 is a flowchart illustrating a process performed by the decoding apparatus 600 according to the third embodiment. As illustrated in FIG. 24, with the decoding apparatus 600, the image acquisition unit 610 acquires image information (Step S601) and the marker detecting unit 620 detects a marker (Step S602).

Subsequently, the decoding processing unit 630 specifies an encrypted region in accordance with the detected location of the marker and decodes encrypted information contained in the encrypted region (Step S603). The information restoring unit 640 then acquires restoration information (Step S604).

Then, by deleting the marker in accordance with the restoration information, the information restoring unit 640 restores the image (Step S605). The image output unit 650 then outputs the restored image information (Step S606).

As described above, when the encryption apparatus 500 according to the third embodiment creates a marker, the encryption apparatus 500 creates a marker by calculating the difference value between adjacent pixel values in a marker arrangement region and by overwriting the high-order n bits (for example 2 bits) of the calculated difference value with "1" or "0". Accordingly, it is possible to efficiently create a marker.

[a] Fourth Embodiment

In the above explanation, the embodiment of the present invention has been described; however, the present invention can be implemented with various kinds of embodiments other than the first to third embodiments. Therefore, another embodiment included in the present invention will be described below.

(1) Restoration Information

Figure 25:
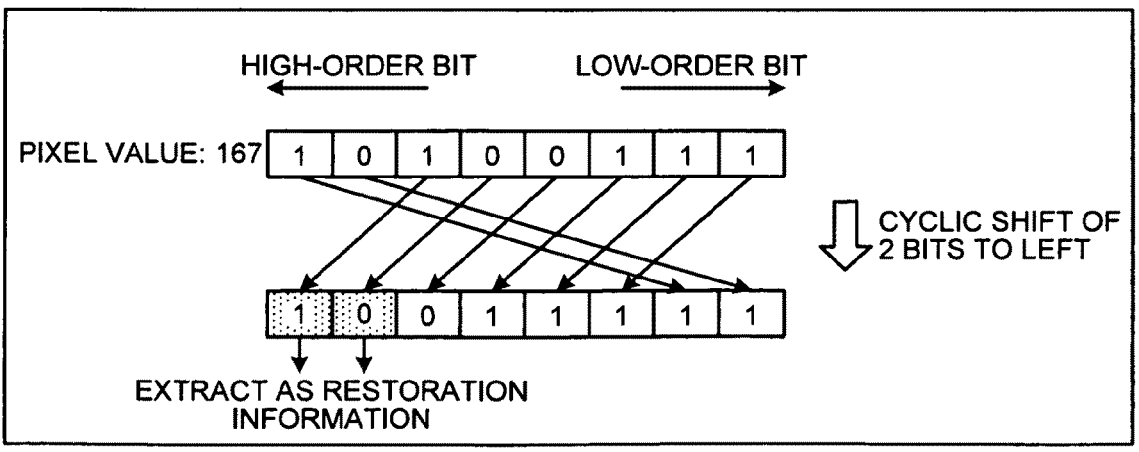
FIG. 25 is a schematic diagram illustrating a method for extracting other restoration information.

In the first embodiment, the high-order n bits of a pixel value of a marker arrangement region are extracted as restoration information; however, restoration information can be extracted after changing a pixel value once. FIG. 25 is a schematic diagram illustrating a method for extracting other restoration information.

As illustrated in FIG. 25, by extracting, as restoration information, the high-order 2 bits of a value subjected to a cyclic shift of n bits to the left (n is a natural number; a description is given with the assumption that n bits are 2 bits in FIG. 25) of the bit sequence of the pixel value 167, and the low-order 2 bits, in practice, can be extracted as the restoration information. After extracting the restoration information, the encryption apparatus creates a marker by overwriting the high-order 2 bits of the value subjected to the cyclic shift of 2 bits to the left with "1" or "0".

Because the decoding apparatus uses the restoration information extracted by the encryption apparatus, the restoration information can be stored in, for example, a file or an image header. When storing the restoration information, it can also be stored after further reducing, using the existing technology, the amount of the restoration information.

(2) Process for Removing a Marker

If an image is obtained by scanning printed material, there may be a case in which the decoding apparatus does not completely restore the image to the original image due to ink or toner bleeding when the image is printed or due to distortion when it is scanned. Even when an obtained image is a digital image, in some cases, a pixel value varies in accordance with the compression method that is used after the encryption. In such a case, the decoding apparatus also cannot completely restore the image to the original image. Furthermore, the decoding apparatus also cannot restore an image when the restoration information cannot be obtained due to, for example, an error.

If bleeding or distortion is present in a marker detection region, if a pixel value in a marker detection region varies due to image compression, and if restoration information cannot be obtained, the decoding apparatus can also restore a pixel value by performing image interpolation.

Figure 26:
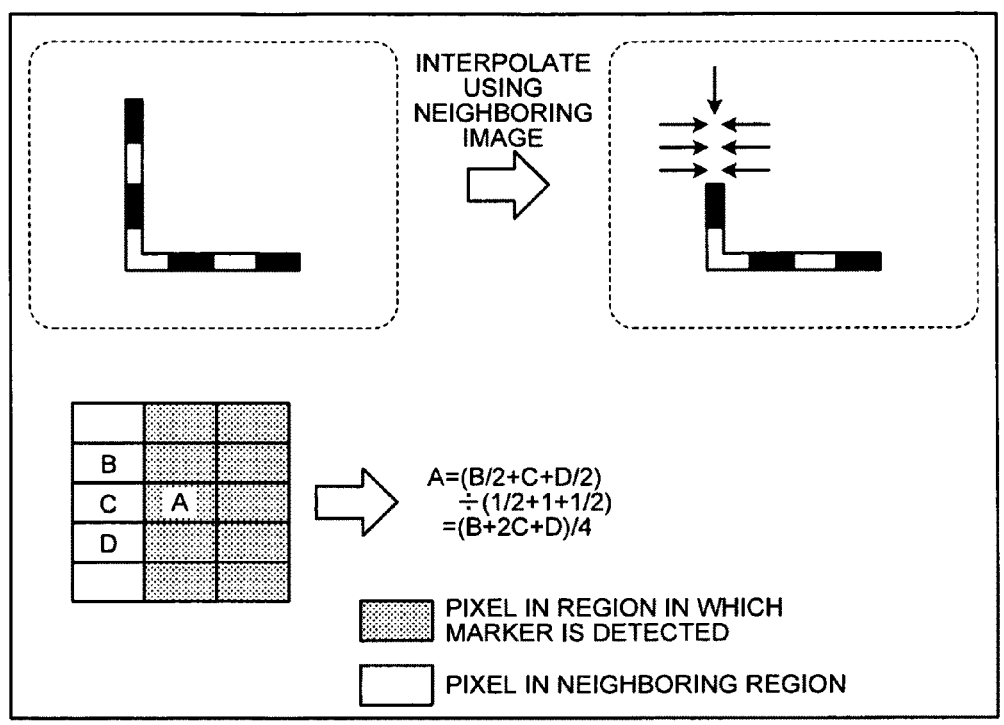
FIG. 26 is a schematic diagram illustrating image interpolation.

FIG. 26 is a schematic diagram illustrating image interpolation. As illustrated in the upper portion of FIG. 26, the decoding apparatus can delete a marker by performing the image interpolation in accordance with a neighboring image. Specifically, it is also possible to perform the image interpolation by using an estimated value of the minimum region P weighted using the distance from a neighboring region, as Equation (3) below illustrates:

$$\text{estimated value } P) = \sum_{i=0}^{k-1} (\text{pixel value of } n_i/r_i) \Big/ \sum_{i=0}^{k-1} (1/r_i) \quad (3)$$

where, $n_i$ (i=0, 1, ..., k-1) is the neighboring pixel of the minimum region P, and $r_i$ (i=0, 1, ..., k-1) is the distance between the minimum region P and the neighboring pixel $n_i$.

More specifically, as illustrated in the lower portion of FIG. 26, if a pixel in a marker detection region is defined as a pixel A, if neighboring images of the pixel A are defined as a pixel B, C, and D, respectively, if the distance between the pixel A and the pixel C is defined as 1, and if the distances between the pixel A and the pixel B and the pixel A and the pixel C are defined as 2, a pixel value of the pixel A can be obtained by using Equation (4) below:

$$A=(B+2C+D)/4 \quad (4)$$

By restoring an image using either a method for restoring an image described in the first to third embodiments or using the image interpolation described above, the decoding apparatus can perform marker restoration used for both electronic data and printed material.

(3) System Configuration, Etc.

Of the processes described in the embodiments, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise noted.

The components of each device, i.e., the encryption apparatuses 100, 300, and 500, and the decoding apparatuses 200, 400, and 600 are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions.

With the encryption apparatuses 100, 300, and 500 according to the embodiments, the marker creating unit creates a marker and then the encryption processing unit performs the encryption process; however, the present invention is not limited thereto. For example, the marker creating unit can also create a marker after the encryption processing unit performs the encryption process. Alternatively, image information can also be output to an external unit without processing the encryption process and then another apparatus can also embed encrypted information in an encrypted region specified by a marker. Furthermore, the decoding apparatuses 200, 400, and 600 according to the embodiments do not necessarily perform a decoding process.

Furthermore, all or any part of the processing functions performed by each device can be implemented by a CPU and by programs analyzed and executed by the CPU or implemented as hardware by wired logic.

Figure 27:
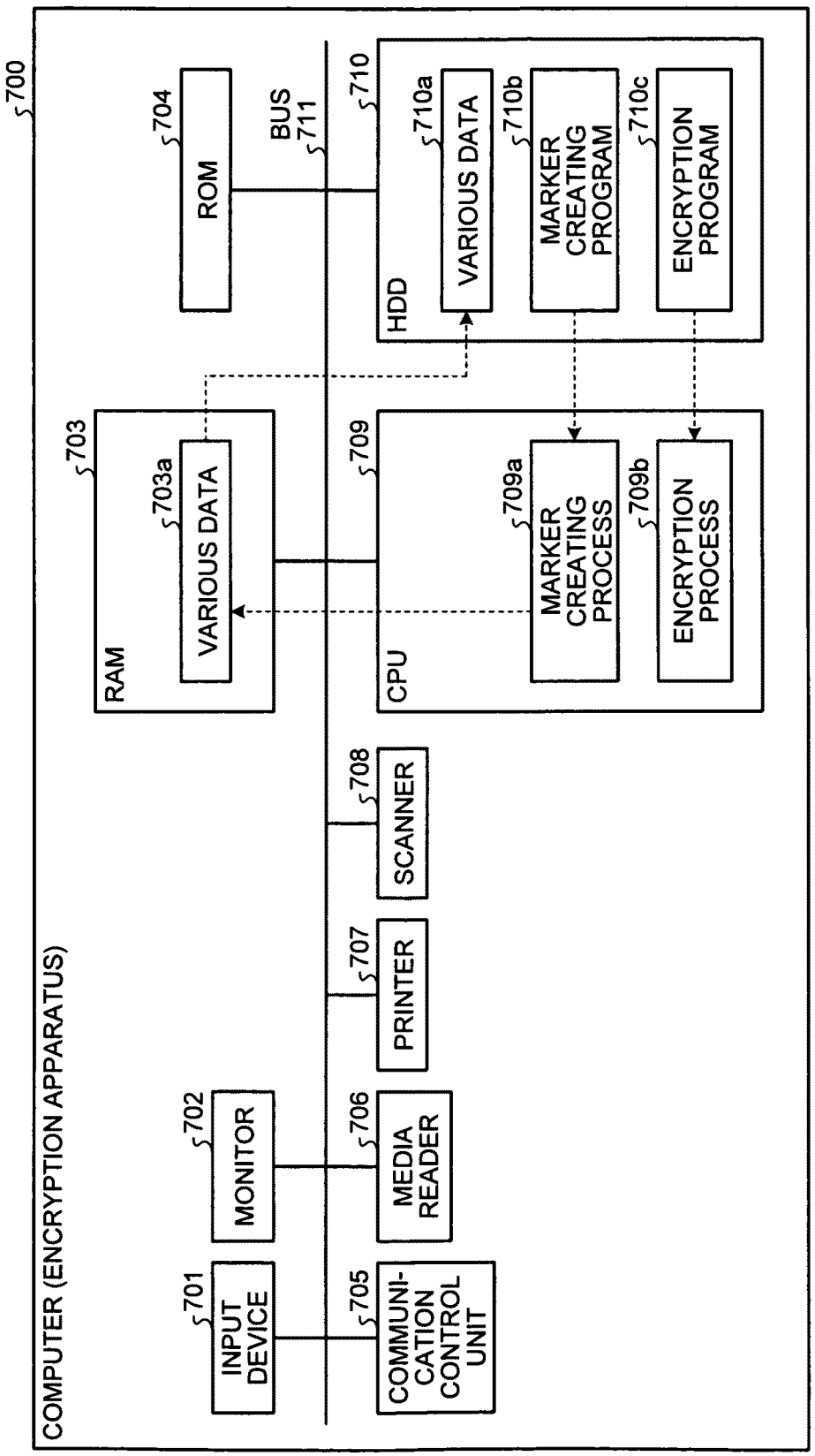
FIG. 27 is a schematic diagram illustrating the hardware configuration of a computer constituting the encryption apparatuses according to the embodiments.

FIG. 27 is a schematic diagram illustrating the hardware configuration of a computer constituting the encryption apparatus 100, 300 or 500 (the same also applies to the description below) according to the embodiments. A computer 700 includes an input device 701 that receives data from a user, a monitor 702, a random access memory (RAM) 703, a read only memory (ROM) 704, a communication control unit 705 that receives/transmits data between other computers via a network, a media reader 706 that reads a program from a recording medium that has stored therein various programs, a printer 707, a scanner 708, a central processing unit (CPU) 709, and a hard disk drive (HDD) 710, which are all connected via a bus 711.

The HDD 710 stores therein a marker creating program 710b and an encryption program 710c having the same function as that performed by the encryption apparatus 100 described above. Because the CPU 709 reads the marker creating program 710b and the encryption program 710c and executes them, a marker creating process 709a and an encryption process 709b that implement each function performed by functioning units in the encryption apparatus 100 are started. The marker creating process 709a corresponds to the image acquisition unit 110, the region specifying unit 120, the restoration information extracting unit 130, the marker creating unit 140, and the image output unit 160 illustrated in FIG. 3. The encryption process 709b corresponds to the encryption processing unit 150 illustrated in FIG. 3.

Furthermore, the CPU 709 stores, as various data 703a in the RAM 703, the image data and the restoration information created when a marker creating process and an encryption process are performed and then allows the HDD 710 to record the various data 703a as various data 710a. The various data 710a recorded in the HDD 710 is output to, for example, the decoding apparatus and is used.

Figure 28:
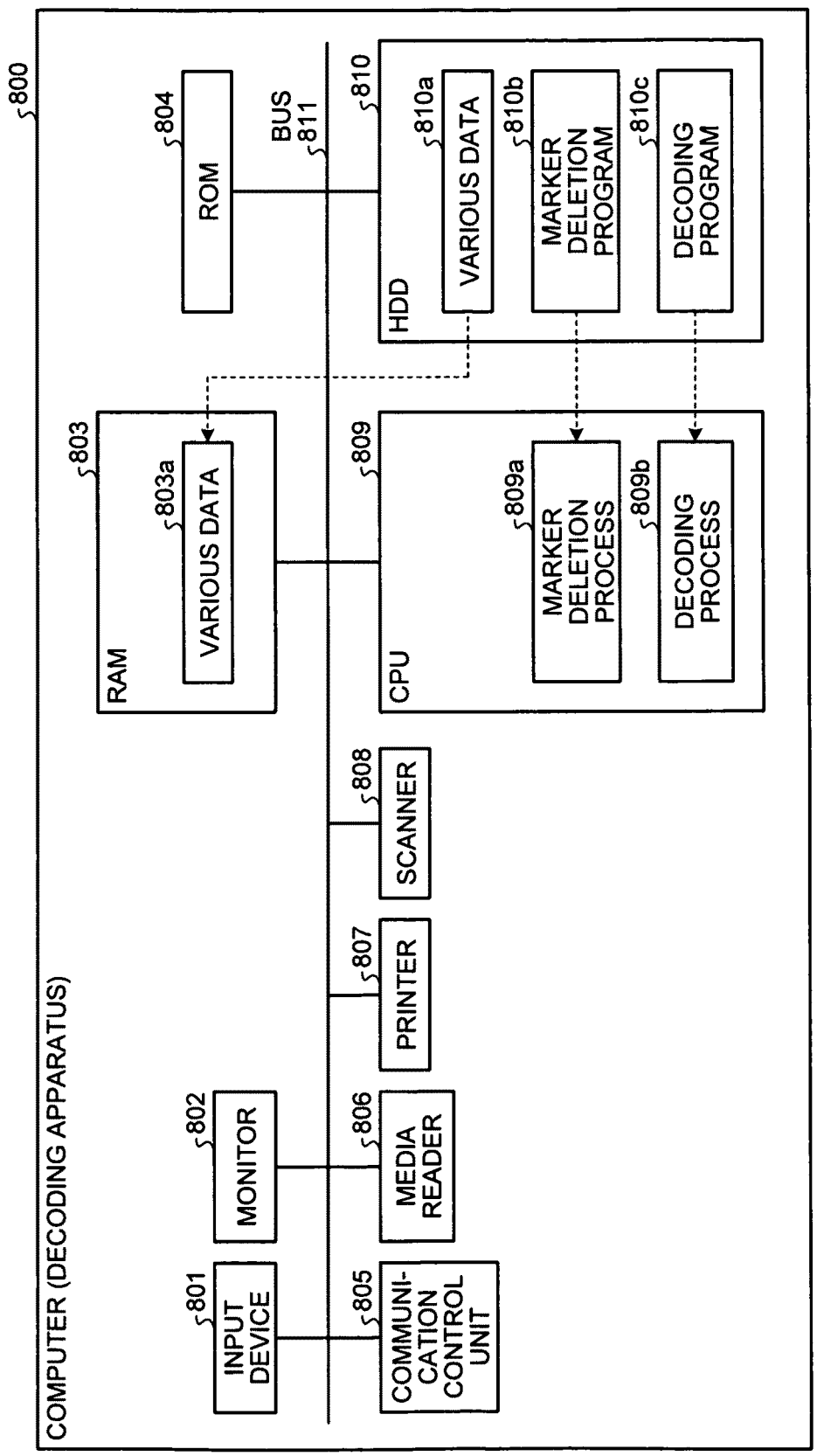
FIG. 28 is a schematic diagram illustrating the hardware configuration of a computer constituting the decoding apparatuses according to the embodiments.
Figure 29:
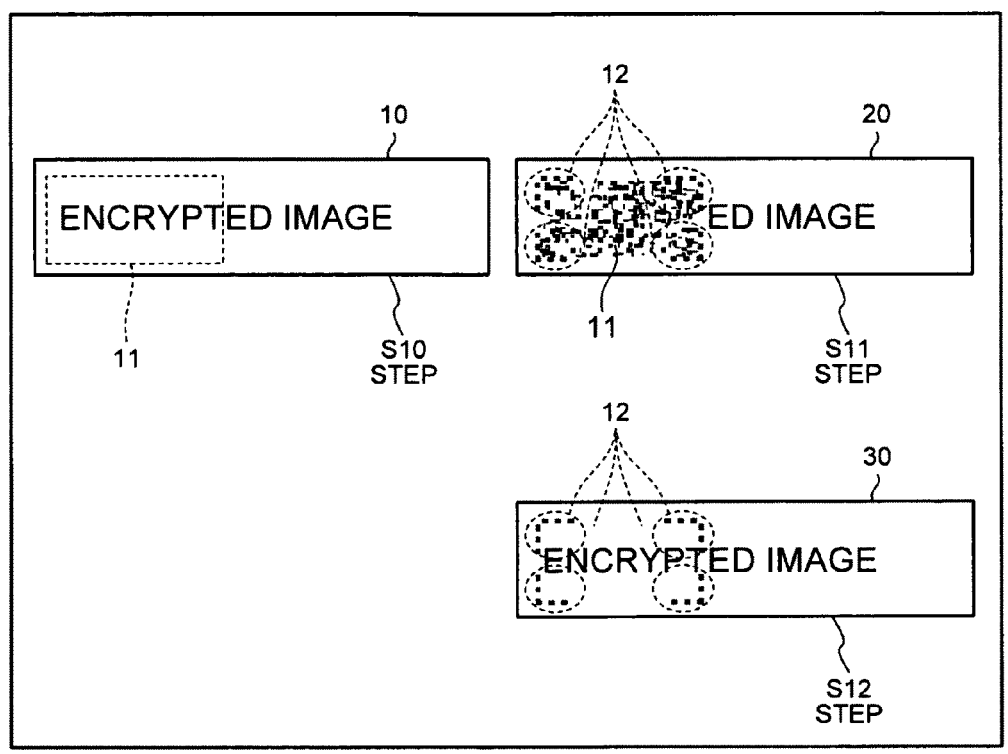
FIG. 29 is a schematic diagram illustrating a conventional technology.

FIG. 28 is a schematic diagram illustrating the hardware configuration of a computer constituting the decoding apparatus 200, 400, or 600 (the same also applies to the description below) according to the embodiments. A computer 800 includes an input device 801 that receives data from a user, a monitor 802, a RAM 803, a ROM 804, a communication control unit 805 that receives/transmits data between other computers via a network, a media reader 806 that reads a program from a recording medium that has stored therein various programs, a printer 807, a scanner 808, a CPU 809, and an HDD 810, which are all connected via a bus 811.

The HDD 810 stores therein a marker deletion program 810*b* and a decoding program 810*c* having the same function as that performed by the decoding apparatus 200 described above. Because the CPU 809 reads the marker deletion program 810*b* and the decoding program 810*c* and executes them, a marker deletion process 809*a* and a decoding process 809*b* that implement each function performed by functioning units in the decoding apparatus 200 are started. The marker deletion process 809*a* corresponds to the image acquisition unit 210, the marker detecting unit 220, the information restoring unit 240, and the image output unit 250 illustrated in FIG. 7. The decoding process 809*b* corresponds to the decoding processing unit 230 illustrated in FIG. 7.

Furthermore, the HDD 810 stores therein various data 810*a* including the image information and the restoration information obtained from, for example, the encryption apparatus. The CPU 809 reads the various data 810*a* to store it in the RAM 803, removes a marker using the various data 810*a* stored in the RAM 803, and restores encrypted information in an encrypted region; therefore, an image is restored.

The marker creating program 710*b*, the encryption program 710*c*, the marker deletion program 810*b*, and the decoding program 810*c* are not necessarily stored in the HDDs 710 and 810 from the beginning. For example, the marker creating program 710*b*, the encryption program 710*c*, the marker deletion program 810*b*, and the decoding program 810*c* can be stored in a "portable physical medium", such as a flexible disk (FD), a CD-ROM, a DVD disk, a magneto-optic disk, an IC CARD, and the like, which can be inserted into a computer; a "fixed physical medium", such as a hard disk drive (HDD) that can be arranged inside/outside the computer; and "another computer (or a server)" connected to the computer via a public circuit, the Internet, a LAN, a WAN, and the like. The computer then reads, from the above, and executes the marker creating program 710*b*, the encryption program 710*c*, the marker deletion program 810*b*, and the decoding program 810*c*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein a marker creating program, the marker creating program causing a computer to execute a procedure comprising:
   extracting, when a region in which a marker is created is set on an image, a part of a bit sequence constituting a pixel in the region as restoration information for restoring the pixel in the region; and
   creating the marker by changing the part of the bit sequence constituting the pixel in the region to one or zero.

2. A non-transitory computer readable storage medium having stored therein a marker creating program, the marker creating program causing a computer to execute a procedure comprising:
   extracting, when a region in which a marker is created is set on an image, one-bit information indicating that a bit sequence constituting a pixel in the region is inverted as restoration information for restoring the pixel in the region;
   storing the one-bit information and coordinates within the region in which the marker is created in association with each other in a storage unit; and
   creating the marker by inverting the bit sequence constituting the pixel in the region.

3. The non-transitory computer readable storage medium according to claim 1, wherein
   the extracting includes calculating a difference between adjacent pixel values in the region in which the marker is created and extracts, as the restoration information, a part of a bit sequence of the calculated difference, and
   the creating includes creating the marker by changing the part of the bit sequence of the difference to one or zero.

4. The non-transitory computer readable storage medium according to claim 2, wherein
   the extracting includes calculating a difference between adjacent pixel values in the region in which the marker is created and extracts, as the restoration information, information indicating whether a bit sequence of the calculated difference is inverted, and
   the creating includes creating the marker by inverting the bit sequence of the difference.

5. The non-transitory computer readable storage medium according to claim 2, further causing a computer to execute a procedure comprising determining, when the region in which the marker is created is set on the image and in accordance with a pixel in a region adjacent, to the region in which the marker is created, whether a bit sequence constituting the image in the region in which the marker is created is inverted, wherein
   the extracting includes extracting, as the restoration information in accordance with a determination result at the determining, information indicating whether the bit sequence constituting the pixel in the region in which the marker is created is inverted or a part of the bit sequence constituting the pixel in the region in which the marker is created, and
   the creating includes creating, in accordance with the determination result at the determining, the marker by inverting the bit sequence constituting the pixel in the region in which the marker is created or by changing the part of the bit sequence constituting the pixel in the region in which the marker is created to one or zero.

6. The non-transitory computer readable storage medium according to claim 1, further causing a computer to execute a procedure comprising:
   detecting a marker on an image; and
   restoring, when the marker is detected on the image and in accordance with restoration information for restoring a pixel in a region in which the marker is created, the image in the region in which the marker is created.

7. The non-transitory computer readable storage medium according to claim 6, further causing a computer to execute a procedure comprising:
   determining, using the restoration information, whether the image in the region in which the marker is created is restored; and interpolating the region using a neighboring image if it is determined, at the determining, that the image in the region is not restored.

8. A marker creating apparatus comprising:
an extracting unit that extracts, when a region in which a marker is created is set on an image, a part of a bit sequence constituting a pixel in the region as restoration information for restoring the pixel in the region; and
a creating unit that creates the marker by changing the part of the bit sequence constituting the pixel in the region to one or zero.

9. The marker creating apparatus according to claim 8, further includes
a detecting unit that detects a marker on an image; and
a restoring unit that restores, when the marker is detected on the image and in accordance with restoration information for restoring a pixel in a region in which the marker is created, the image in the region in which the marker is created.

10. A marker creating method comprising:
extracting, when a region in which a marker is created is set on an image, a part of a bit sequence constituting a pixel in the region as restoration information for restoring the pixel in the region; and
creating the marker by changing the part of the bit sequence constituting the pixel in the region to one or zero.

* * * * *